(12) United States Patent
Krah et al.

(10) Patent No.: US 7,710,397 B2
(45) Date of Patent: May 4, 2010

(54) MOUSE WITH IMPROVED INPUT MECHANISMS USING TOUCH SENSORS

(75) Inventors: Christoph H. Krah, San Jose, CA (US); Jeffrey B. Doar, Fremont, CA (US); Sean Corbin, Menlo Park, CA (US); Shin Nishibori, San Francisco, CA (US); Wing Kong Low, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 796 days.

(21) Appl. No.: 11/144,345

(22) Filed: Jun. 3, 2005

(65) Prior Publication Data

US 2006/0274042 A1    Dec. 7, 2006

(51) Int. Cl.
G06F 3/033    (2006.01)
(52) U.S. Cl. ..................................... 345/163
(58) Field of Classification Search ................. 345/156, 345/163–166, 173
See application file for complete search history.

(56) References Cited

U.S. PATENT DOCUMENTS

| | | | |
|---|---|---|---|
| 4,110,749 A | 8/1978 | Janko et al. | |
| 4,264,903 A | 4/1981 | Bigelow | |
| 4,719,524 A | 1/1988 | Morishima et al. | |
| 4,736,191 A | 4/1988 | Matzke et al. | |
| 4,866,602 A | 9/1989 | Hall | |
| 4,917,516 A | 4/1990 | Retter | |
| 4,922,236 A | 5/1990 | Heady | |
| 5,122,785 A * | 6/1992 | Cooper | 345/163 |
| 5,125,077 A | 6/1992 | Hall | |
| 5,179,648 A | 1/1993 | Hauck | |
| 5,186,646 A | 2/1993 | Pederson | |
| 5,237,311 A | 8/1993 | Mailey et al. | |
| D349,280 S | 8/1994 | Kaneko | |

(Continued)

FOREIGN PATENT DOCUMENTS

DE    4125049    1/1992

(Continued)

OTHER PUBLICATIONS

"ITT Industries, Cannon Launches First Miniature Trackball". Jan. 6, 2004. Thomas Industrial Network. <http://news.thomasnet.com/fullstory/29536> Accessed Online: Apr. 17, 2008.*

(Continued)

*Primary Examiner*—Chanh Nguyen
*Assistant Examiner*—Allison Walthall
(74) *Attorney, Agent, or Firm*—Morrison & Foerster LLP

(57) ABSTRACT

A mouse having improved input methods and mechanisms is disclosed. The mouse is configured with touch sensing areas capable of generating input signals. The touch sensing areas may for example be used to differentiate between left and right clicks in a single button mouse. The mouse may further be configured with force sensing areas capable of generating input signals. The force sensing areas may for example be positioned on the sides of the mouse so that squeezing the mouse generates input signals. The mouse may further be configured with a jog ball capable of generating input signals. The mouse may additionally be configured with a speaker for providing audio feedback when the various input devices are activated by a user.

22 Claims, 14 Drawing Sheets

U.S. PATENT DOCUMENTS

| | | |
|---|---|---|
| 5,339,213 A | 8/1994 | O'Callaghan |
| 5,355,148 A | 10/1994 | Anderson |
| 5,404,152 A | 4/1995 | Nagai |
| 5,414,445 A | 5/1995 | Kaneko et al. |
| D362,431 S | 9/1995 | Kaneko et al. |
| 5,473,343 A | 12/1995 | Kimmich et al. |
| 5,473,344 A | 12/1995 | Bacon et al. |
| 5,495,566 A | 2/1996 | Kwatinetz |
| 5,528,265 A | 6/1996 | Harrison |
| 5,559,943 A | 9/1996 | Cyr et al. |
| 5,561,445 A | 10/1996 | Miwa et al. |
| 5,565,887 A | 10/1996 | McCambridge et al. |
| 5,578,817 A | 11/1996 | Bidiville et al. |
| 5,585,823 A | 12/1996 | Duchon et al. |
| 5,596,347 A | 1/1997 | Robertson et al. |
| 5,598,183 A | 1/1997 | Robertson et al. |
| 5,611,040 A | 3/1997 | Brewer et al. |
| 5,611,060 A | 3/1997 | Belfiore et al. |
| D382,550 S | 8/1997 | Kaneko et al. |
| 5,661,505 A | 8/1997 | Livits |
| D385,542 S | 10/1997 | Kaneko et al. |
| 5,686,720 A | 11/1997 | Tullis |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,786,804 A | 7/1998 | Gordon |
| 5,786,818 A | 7/1998 | Brewer et al. |
| 5,812,114 A | 9/1998 | Loop |
| 5,825,353 A | 10/1998 | Will |
| 5,828,364 A | 10/1998 | Siddiqui |
| 5,838,304 A | 11/1998 | Hall |
| 5,841,425 A | 11/1998 | Zenz |
| 5,841,426 A | 11/1998 | Dodson et al. |
| D402,281 S | 12/1998 | Ledbetter et al. |
| 5,850,213 A | 12/1998 | Imai et al. |
| 5,856,822 A | 1/1999 | Du et al. |
| 5,889,236 A | 3/1999 | Gillespie et al. |
| 5,903,229 A | 5/1999 | Kishi |
| 5,907,152 A | 5/1999 | Dändliker et al. |
| 5,907,318 A | 5/1999 | Medina |
| 5,909,211 A | 6/1999 | Combs et al. |
| 5,914,706 A | 6/1999 | Kono |
| 5,956,019 A | 9/1999 | Bang et al. |
| 5,959,611 A | 9/1999 | Smailagic et al. |
| 5,982,302 A | 11/1999 | Ure |
| 5,991,431 A | 11/1999 | Borza et al. |
| 5,999,166 A | 12/1999 | Rangan |
| 6,002,389 A | 12/1999 | Kasser |
| 6,005,299 A | 12/1999 | Hengst |
| 6,031,518 A | 2/2000 | Adams et al. |
| 6,064,370 A | 5/2000 | Wang et al. |
| 6,075,533 A | 6/2000 | Chang |
| 6,084,574 A | 7/2000 | Bidiville |
| 6,111,563 A | 8/2000 | Hines |
| 6,115,028 A | 9/2000 | Balakrishnan et al. |
| 6,124,587 A | 9/2000 | Bidiville et al. |
| 6,128,006 A | 10/2000 | Rosenberg et al. |
| 6,130,664 A | 10/2000 | Suzuki |
| 6,163,312 A | 12/2000 | Furuya |
| 6,166,721 A | 12/2000 | Kuroiwa et al. |
| 6,181,322 B1 | 1/2001 | Nanavati |
| 6,188,389 B1 | 2/2001 | Yen |
| 6,188,393 B1 | 2/2001 | Shu |
| 6,191,774 B1 | 2/2001 | Schena et al. |
| 6,198,473 B1 | 3/2001 | Armstrong |
| 6,211,861 B1 | 4/2001 | Rosenberg et al. |
| 6,219,038 B1 | 4/2001 | Cho |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| D443,616 S | 6/2001 | Fisher et al. |
| 6,243,078 B1 | 6/2001 | Rosenberg |
| 6,256,011 B1 | 7/2001 | Culver |
| 6,262,717 B1 | 7/2001 | Donohue et al. |
| 6,266,050 B1 | 7/2001 | Oh et al. |
| 6,281,882 B1 | 8/2001 | Gordon et al. |
| 6,297,795 B1 | 10/2001 | Kato et al. |
| 6,323,843 B2 | 11/2001 | Giles et al. |
| 6,323,845 B1 | 11/2001 | Robbins |
| 6,333,734 B1 | 12/2001 | Rein |
| 6,340,800 B1 | 1/2002 | Zhai et al. |
| D454,568 S | 3/2002 | Andre et al. |
| 6,356,524 B2 | 3/2002 | Aratani |
| 6,369,797 B1 | 4/2002 | Maynard |
| 6,373,470 B1 | 4/2002 | Andre et al. |
| 6,377,530 B1 | 4/2002 | Burrows |
| 6,392,632 B1 | 5/2002 | Lee |
| 6,392,634 B1 | 5/2002 | Bowers et al. |
| 6,392,636 B1 | 5/2002 | Ferrari et al. |
| 6,433,780 B1 | 8/2002 | Gordon et al. |
| 6,469,693 B1 | 10/2002 | Chiang et al. |
| 6,489,947 B2 | 12/2002 | Hesley et al. |
| 6,505,088 B1 | 1/2003 | Simkin et al. |
| 6,513,717 B2 | 2/2003 | Hannigan |
| 6,545,665 B2 | 4/2003 | Rodgers |
| 6,559,830 B1 | 5/2003 | Hinckley et al. |
| 6,587,093 B1 | 7/2003 | Shaw et al. |
| 6,606,085 B1 * | 8/2003 | Endo et al. .................. 345/159 |
| 6,636,197 B1 | 10/2003 | Goldenberg et al. |
| 6,639,584 B1 | 10/2003 | Li |
| 6,650,975 B2 | 11/2003 | Ruffner |
| 6,677,927 B1 | 1/2004 | Bruck et al. |
| 6,686,904 B1 | 2/2004 | Sherman et al. |
| 6,703,550 B2 | 3/2004 | Chu |
| 6,703,599 B1 | 3/2004 | Casebolt et al. |
| 6,704,860 B1 | 3/2004 | Moore |
| 6,707,027 B2 | 3/2004 | Liess et al. |
| 6,717,569 B1 | 4/2004 | Gruhl et al. |
| 6,724,366 B2 | 4/2004 | Crawford |
| 6,724,817 B1 | 4/2004 | Simpson et al. |
| 6,727,889 B2 | 4/2004 | Shaw |
| 6,738,045 B2 | 5/2004 | Hinckley et al. |
| 6,740,860 B2 | 5/2004 | Kobayashi |
| 6,762,751 B2 | 7/2004 | Kuan |
| 6,791,533 B2 | 9/2004 | Su |
| 6,795,056 B2 | 9/2004 | Norskog et al. |
| 6,795,057 B2 | 9/2004 | Gordon |
| 6,816,150 B2 | 11/2004 | Casebolt et al. |
| 6,828,958 B2 | 12/2004 | Davenport |
| 6,833,825 B1 | 12/2004 | Farag et al. |
| 6,844,871 B1 | 1/2005 | Hinckley et al. |
| 6,844,872 B1 | 1/2005 | Farag et al. |
| 6,848,014 B2 | 1/2005 | Landron et al. |
| 6,865,718 B2 | 3/2005 | Levi |
| 6,950,094 B2 | 9/2005 | Gordon et al. |
| 6,995,744 B1 | 2/2006 | Moore et al. |
| 7,046,230 B2 | 5/2006 | Zadesky et al. |
| 7,051,291 B2 | 5/2006 | Sciammarella et al. |
| 7,084,856 B2 | 8/2006 | Huppi |
| 7,113,196 B2 | 9/2006 | Kerr |
| 7,119,792 B1 | 10/2006 | Andre et al. |
| 7,164,412 B1 | 1/2007 | Kao |
| 7,168,047 B1 | 1/2007 | Huppi |
| 7,170,488 B2 | 1/2007 | Kehlstadt et al. |
| 7,233,318 B1 | 6/2007 | Farag et al. |
| 7,239,800 B2 | 7/2007 | Bilbrey |
| 7,358,963 B2 | 4/2008 | Low et al. |
| 7,452,098 B2 | 11/2008 | Kerr |
| 2001/0011991 A1 | 8/2001 | Wang et al. |
| 2001/0011995 A1 * | 8/2001 | Hinckley et al. ............. 345/156 |

| | | | |
|---|---|---|---|
| 2001/0050673 A1 | 12/2001 | Davenport | |
| 2001/0051046 A1 | 12/2001 | Watanabe et al. | |
| 2002/0063688 A1 | 5/2002 | Shaw et al. | |
| 2002/0093487 A1 | 7/2002 | Rosenberg | |
| 2002/0130839 A1 | 9/2002 | Wallace et al. | |
| 2002/0130841 A1 | 9/2002 | Scott | |
| 2002/0154090 A1 | 10/2002 | Lin | |
| 2003/0043121 A1 | 3/2003 | Chen | |
| 2003/0050092 A1 | 3/2003 | Yun | |
| 2003/0076301 A1 | 4/2003 | Tsuk et al. | |
| 2003/0076303 A1* | 4/2003 | Huppi | 345/163 |
| 2003/0080942 A1* | 5/2003 | Danzyger et al. | 345/163 |
| 2003/0095096 A1 | 5/2003 | Robbin et al. | |
| 2003/0098851 A1 | 5/2003 | Brink | |
| 2003/0107551 A1 | 6/2003 | Dunker | |
| 2003/0107552 A1 | 6/2003 | Lu | |
| 2003/0184517 A1 | 10/2003 | Senzui et al. | |
| 2004/0046741 A1 | 3/2004 | Low et al. | |
| 2004/0156192 A1 | 8/2004 | Kerr et al. | |
| 2004/0239622 A1 | 12/2004 | Proctor et al. | |
| 2004/0242269 A1 | 12/2004 | Fadell | |
| 2004/0252109 A1 | 12/2004 | Trent et al. | |
| 2004/0263477 A1* | 12/2004 | Davenport et al. | 345/163 |
| 2005/0084138 A1 | 4/2005 | Inkster et al. | |
| 2005/0228320 A1 | 10/2005 | Klinghult | |
| 2005/0259077 A1 | 11/2005 | Adams et al. | |

FOREIGN PATENT DOCUMENTS

| | | |
|---|---|---|
| DE | 19722636 | 12/1998 |
| DE | 10022537 | 11/2000 |
| DE | 10201193 | 7/2003 |
| EP | 0 498 540 A2 | 1/1992 |
| EP | 0653725 | 5/1995 |
| EP | 0768619 | 4/1997 |
| EP | 0795837 | 9/1997 |
| EP | 0 880 Q91 A2 | 11/1998 |
| EP | 1 026 713 A1 | 8/2000 |
| JP | 03/237520 | 10/1991 |
| JP | 07-319001 | 12/1995 |
| JP | 63106826 A | 5/1998 |
| JP | 10326149 A | 12/1998 |
| JP | 11-194863 | 7/1999 |
| JP | 11-194872 | 7/1999 |
| JP | 11-194883 | 7/1999 |
| JP | 2000-215549 | 8/2000 |
| JP | 2000242424 | 9/2000 |
| JP | 2001-051790 | 2/2001 |
| JP | EP 1241558 | 9/2002 |
| JP | 2003280807 | 2/2003 |
| TW | 431607 | 4/2001 |
| WO | WO 90/05972 | 5/1990 |
| WO | WO 94/17494 | 8/1994 |
| WO | 98/14863 | 4/1998 |
| WO | WO 99/26330 | 5/1999 |
| WO | WO 99/49443 | 9/1999 |
| WO | WO 00/39907 | 7/2000 |
| WO | WO 02052494 | 7/2002 |
| WO | WO 03077110 | 9/2003 |
| WO | WO 2006/132817 | 12/2006 |

OTHER PUBLICATIONS

Microsoft Inc., "Scroll and zoom on a Microsoft Excel sheet by using the Microsoft Intellimouse pointing device", 1991, pp. 1-3.
U.S. Appl. No. 10/060,712, filed Jan. 29, 2002.
U.S. Appl. No. 10/157,343, filed May 28, 2002.
U.S. Appl. No. 10/654,108, filed Sep. 2, 2003.
U.S. Appl. No. 29/231,465, filed Jun. 3, 2005.
U.S. Appl. No. 10/238,380, filed Sep. 9, 2002.
"System Service and Troubleshooting Manual", www.dsplib.com/intv/Master, downloaded Dec. 11, 2002.
Apple Computer, Inc., "Apple Pro Mouse," Jul. 2000, Apple Pro Mouse Design Innovations product specification, pp. 1-11.
David Nagel, "More Details on the New Pro Keyboard and Button-Less Mouse," Jul. 2000, http://www.creativemac.com/HTM/News/07_00/detailskeyboardmouse.htm pp. 1-2.
Joh Siracusa, "MacWorld Expo NY 2000," Jul. 2000, http://www.arstechnica.com/wanderdesk/3q00/macworld2k/mwny-2.html pp. 1-6.
"About Quicktip®" www.logicad3d.com/docs/qt.html, downloaded Apr. 8, 2002.
"OEM Touchpad Modules" website www.glidepoint.com/sales/modules.index.shtml, downloaded Feb. 13, 2002.
"Product Overview—ErgoCommander®", www.logicad3d.com/products/ErgoCommander.htm, downloaded Apr. 8, 2002.
"Product Overview—SpaceMouse® Classic", www.logicad3d.com/products/Classic.htm, downloaded Apr. 8, 2002.
Sylvania, "Intellivision™ Intelligent Television Master Component Service Manual," pp. 1, 2 and 8, 1979.
Gadgetboy, "Point and click with the latest mice", CNETAsia Product Review, www.asia.cnet.com/reviews...are/gadgetboy/0,39001770,38023590,00.htm, downloaded Dec. 5, 2001.
Tessler et al. "Touchpads Three new input devices", website www.macworld.com/1996/02/review/1806.html, download Feb. 13, 2002.
"Synaptics Tough Pad Interfacing Guide" Second Edition, Mar. 25, 1998, Synaptics, Inc. San Jose, CA, pp. 1 to 90.
Fiore, Andrew, "Zen Touchpad", Cornell University, May 2000.
Flaminio, Michael, "IntelliMouse Explorer", IGM Review, Oct. 4, 1999.
Grevstad, Eric, "Microsoft Wireless IntelliMouse Explorer Review The Ultimate Pointing Machine", HardwareCentral Review, Jun. 24, 2003.
Grevstad, Eric, "Microsoft Wireless IntelliMouse Explorer Review The Ultimate Pointing Machine", HardwareCentral Review, Oct. 9, 2001.
Dreier, Troy, "The Comfort Zone", PC Magazine, Mar. 12, 2002.
"Apple Unveils Optical Mouse and New Pro Keyboard," Press Release, Jul. 19, 2000.
"Der Klangmeister," Connect Magazine, Aug. 1998.
Bang & Olufsen Telecom a/s, "BeoCom 6000 User Guide 2000".
Chapweske, Adam, "PS/2 Mouse/Keyboard Protocol", 1999, http://panda.cs.ndsu.nodak.edu/~achapwes/PICmicro/PS2/ps2.htm.
De Meyer, Kevin, Crystal Optical Mouse, Feb. 14, 2002, Heatseekerz, Web Article 19.
Ken Hinckley et al. "Touch-Sensing Input Devices" CHI 1999 pp. 223-230.
Letter re: Bang & Olufsen A/S, by David Safran, Nixon Peabody, LLP, May 21, 2004.
Marriott et al., U.S. Appl. No. 10/722,948, filed Nov. 25, 2003.
Photographs of Innovations 2000 Best of Show award presented at the 2000 International CES Innovations 2000 Design & Engineering Showcase, 1 pg.
U.S. Appl. No. 10/209,537, filed Jul. 30, 2002.
International Search Report from related application No. PCT/US2006/020341 dated Jun. 12, 2007.
EPO Form 1507 in related EP Application No. 02761784.4 dated Nov. 19, 2004.
IBM. (Nov. 1, 1992). "Pressure-Sensitive Mouse," IBM Technical Disclosure Bulletin, 35(6):288-289.
Letter re: Bang & Olufsen a/s by David Safran, Nixon Peabody, LLP, May 21, 2004, with BeoCom 6000 Sales Training Brochure, six pages.

* cited by examiner

| OFF TABLE DETECT | HIGH FORCE | LOW FORCE | BUTTON ACTIVATION |
|---|---|---|---|
| NO | NO | NO | NO |
| NO | NO | YES | YES |
| YES | NO | YES | NO |
| YES | YES | X | YES |

MOUSE WITH IMPROVED INPUT MECHANISMS USING TOUCH SENSORS

CROSS REFERENCE TO RELATED APPLICATIONS

This application is related to the following applications, which are all herein incorporated by reference:

U.S. Pat. No.: 6,373,470, titled, "CURSOR CONTROL DEVICE HAVING AN INTEGRAL TOP MEMBER," issued Apr. 16, 2002;

U.S. patent application Ser. No.: 10/209,537, titled "MULTI-BUTTON MOUSE," filed on Jul. 30, 2002;

U.S. patent application Ser. No.: 10/060,712, titled "CURSOR CONTROL DEVICE HAVING AN INTEGRAL TOP MEMBER," filed on Jan. 29, 2002;

U.S. patent application Ser. No.: 10/072,765, titled "MOUSE HAVING A ROTARY DIAL," filed on Feb. 7, 2002;

U.S. patent application Ser. No.: 10/238,380, titled "MOUSE HAVING AN OPTICALLY-BASED SCROLLING FEATURE," filed on Sep. 9, 2002;

U.S. patent application Ser. No.: 10/157,343, titled "MOUSE HAVING A BUTTON-LESS PANNING AND SCROLLING SWITCH," filed on May 28, 2002; and U.S. patent application Ser. No.: 10/654,108, titled "AMBIDEXTROUS MOUSE," filed on Sep. 2, 2003.

BACKGROUND OF THE INVENTION

1. Field of the Invention

The present invention relates generally to mice. More particularly, the present invention relates to a mouse including improved input mechanisms.

2. Description of the Related Art

Most computer systems, as for example general purpose computers such as portable computers and desktop computers, receive input from a user via an input device such as a mouse. As is generally well known, the mouse allows a user to move an input pointer and to make selections in a graphical user interface (GUI). The mouse generally includes a trackball, which is located on the underside of the mouse and which rolls when the mouse moves thus translating the motion of the users hand into signals that the computer system can use. The movement of the trackball generally corresponds to the movement of the input pointer in the GUI. That is, by positioning the mouse on a desktop and moving it thereon, the user can move the input pointer in similar directions in the GUI. An optical sensor may alternatively used to track the movement of the mouse.

Conventional mice also include one or two mechanical buttons for data selection and command execution. The mechanical buttons are disposed near the top front portion of the mouse where they are easily accessible to a users fingers. In some mice, a single mechanical button is placed in the middle of the mouse while in other mice, two mechanical buttons are placed on the left and right side of the mouse. In either case, the mechanical buttons typically include button caps that pivot relative to a fixed top back portion of the mouse in order to provide a mechanical clicking action. When pressed, the button caps come down on switches located underneath the button caps thereby generating button event signals. The mice may additionally include a scroll wheel. The scroll wheel allows a user to move through documents by simply rolling the wheel forward or backward. The scroll wheel is typically positioned between the right and left mechanical buttons at the front top portion of the mouse.

The unibody mouse is another type of mouse. Unlike the conventional mouse, the unibody mouse does not include any mechanical buttons thereby making it more elegant than the conventional mouse (e.g., no surface breaks or lines). The unibody mouse includes a base and a top member that acts like a button and that forms the entire top surface of the mouse. The top member pivots relative to the base in order to provide a clicking action. In most cases, the top member moves around a pivot located towards the back of the mouse so that the top member can pivot forward and downward. When pivoted in this manner, the top member activates a switch, which causes the microcontroller in the mouse to send a button event signal to the host computer. Although this design is more elegant than the conventional mouse that includes mechanical buttons, in most cases it only operates as a single button mouse thereby limiting its functionality. The Apple Mouse manufactured by Apple Computer, Inc., of Cupertino, Calif. is one example of a unibody mouse.

Recently, dual button functionality has been implemented in a unibody mouse. In this implementation, the pivot of the top member runs through the middle of the mouse. This allows the top member to rock left and right. Switches are located in both the left and right positions to implement right and left buttons. That is, moving the top member to the right causes a right click to be generated and moving the top member to the left causes a left click to be generated. Unfortunately, the middle pivot does not allow a user to press the middle of the mouse and further the force needed to activate the buttons is high at areas near the middle pivot, and low at areas further away from the middle pivot. The pivoting action therefore feels sloppy and non uniform, which leaves a negative impression on the user. In addition, accidental activation of the buttons may be encountered when the mouse is moved around, i.e., the force used to move the mouse may cause the mouse to tilt to the right or left. Moreover, the form factor is different than other mice which click down in the forward direction and therefore clicking the mouse is not intuitive to the user.

Based on the foregoing, mice with improved form, feel and functionality are therefore desired.

SUMMARY OF THE INVENTION

The invention relates, in one embodiment, to a mouse. The mouse includes a housing and a plurality of button zones on the surface of the housing. The button zones represent regions of the housing that are capable of detecting touch events that occur on the surface of the housing in the region of the button zones.

The invention relates, in another embodiment, to a mouse. The mouse includes a mouse housing having an outer member. The mouse also includes a first touch sensor configured to sense the presence of an object at a first region of the outer member. The mouse further includes a second touch sensor configured to sense the presence of an object at a second region of the outer member, the second region being different than the first region. The mouse additionally includes a sensor management circuit (e.g., microcontroller or other integrated circuit) that monitors the touch signals output by the first and second touch sensors and reports button events based at least in part on the signals output by the first and second touch sensors.

The invention relates, in one embodiment, to a configurable mouse capable of operating as a single button or multi-button mouse. The mouse includes an internal switch that generates an activation signal. The mouse also includes a single moving member that provides a clicking action. The moving member activates the internal switch during the clicking action. The mouse further includes a touch sensing arrangement that generates a first touch signal when the movable member is touched in a first region and a second touch signal when the movable member is touched in a second region. The signals of the internal switch and the touch sensing arrangement indicating one or more button events of the mouse.

The invention relates, in one embodiment, to a mouse. The mouse includes a housing having one or more pressure sensitive areas. The mouse also includes a force sensing device located behind each of the pressure sensitive areas. The force sensing devices being configured to measure the force exerted at the pressure sensitive areas.

The invention relates, in one embodiment, to a mouse. The mouse includes a jog ball device positioned at a surface of the mouse. The jog ball device includes a ball that spins within a sealed housing. The ball has a diameter that is less than 10 mm.

The invention relates, in one embodiment, to a unibody mouse including a base and a movable top member. The unibody mouse includes a base having a first wing located on a right side of the mouse, and a second wing located on a left side of the mouse. The unibody mouse also includes a movable top member coupled to the base. The unibody mouse further includes a first touch sensor located on a front left side of the top member and a second touch sensor located on a front right side of the top member. The first touch sensor generates a first touch signal when the front left side of the top member is touched, and the second touch sensor generates a second touch signal when the front right side of the top member is touched. The unibody mouse additionally includes a jog ball device located in a front middle portion of the top member between the first and second touch sensors. The jog ball device includes a ball configured to generate multidirectional motion signals when the ball is spun within a sealed housing. The jog ball device includes a switch configured to generate a first activation signal when the ball is moved relative to the sealed housing. The unibody mouse further includes a first force sensor located behind the first wing, and a second force sensor located behind the second wing. The first force sensor generates a force signal when increased pressure is exerted on the first wing, and the second force sensor generates a force signal when increased pressure is exerted on the second wing. The unibody mouse additionally includes an internal switch configured to generate a second activation signal when the top member is moved relative to the base and a position sensing device configured to generate tracking signals when the mouse is moved along a surface. Moreover, the unibody mouse includes a microcontroller that monitors all the signals of the above mentioned devices and reports tracking and multiple button events based at least in part on these signals solely or in combination with one another.

The invention relates, in another embodiment to a mouse. The mouse includes an electronically controlled feedback system configured to provide feedback to the user of the mouse so that the user is able to positively confirm that an action has resulted in an actual activation of one or more input mechanisms of the mouse.

The invention relates, in another embodiment to a mouse method. The mouse method includes monitoring pressure at the surface of a mouse. The method also includes performing an action based on a change in pressure at the surface of the mouse.

The invention relates, in another embodiment to a mouse method. The method includes monitoring a force at a surface of a mouse. The method also includes determining whether the mouse has been lifted off a surface. The method further includes if the mouse has not been lifted off the surface, determining if a first force threshold has been exceeded, and reporting a button event signal when the force is above the first force threshold. The method additionally includes if the mouse has been lifted off the surface, determining if a second force threshold has been exceeded, and reporting the button event signal when the force is above the second force threshold.

The invention relates, in another embodiment to a mouse method. The mouse method includes monitoring pressure at mouse surface. The method also includes determining if a squeeze gesture is performed. The method further includes if a squeeze gesture is performed, performing an action in a window management program based on the pressure at the mouse surface.

The invention relates, in another embodiment to a mouse method. The mouse method includes monitoring a left touch sensor, a right touch sensor and a switch. The mouse method also includes reporting a left button event when only the left sensor and switch are activated. The method further includes reporting a right button event when only the right sensor and switch are activated. The method additionally includes reporting a button event when the right sensor, left sensor and switch are activated, the button event being selected from a left button event, a right button event, a third button event, or simultaneous left and right button events.

The invention relates, in another embodiment to a mouse method. The mouse method includes detecting a touch at a surface of a mouse. The method also includes differentiating whether the touch is a light or hard touch. The method further includes performing a first action when a touch is a light touch. The method additionally includes performing a second action when a touch is hard touch.

BRIEF DESCRIPTION OF THE DRAWINGS

The invention may best be understood by reference to the following description taken in conjunction with the accompanying drawings in which.

DETAILED DESCRIPTION OF THE INVENTION

The present invention pertains to a mouse having improved input mechanisms. One aspect of the invention relates to mice with touch sensing areas capable of generating input signals. The touch sensing areas may for example be used to differentiate between left and right clicks in a single button mouse. Another aspect of the invention relates to mice with force sensing areas capable of generating input signals. The force sensing areas may for example be positioned on the sides of the mouse so that squeezing the mouse generates input signals. Another aspect of the invention relates to mice that include a jog ball. The jog ball may be used for positioning a cursor or for providing a way to control scrolling or panning. The jog ball may also be used to provide button events.

Embodiments of the invention are discussed below with reference to FIGS. 2-19. However, those skilled in the art will readily appreciate that the detailed description given herein with respect to these figures is for explanatory purposes as the invention extends beyond these limited embodiments.

Figure 1:
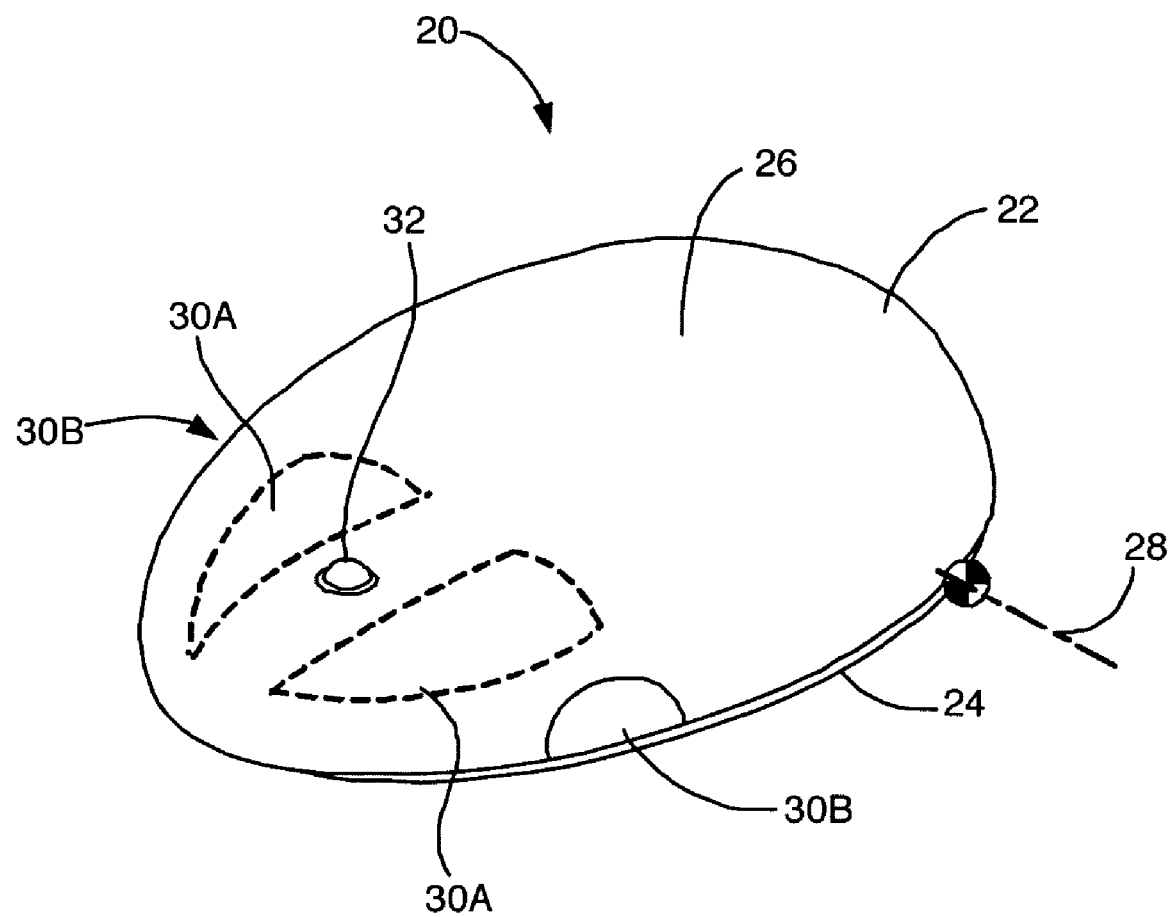
FIG. 1 is a perspective diagram of a mouse, in accordance with one embodiment of the present invention.

FIG. 1 is a perspective view of a mouse 20, in accordance with one embodiment of the present invention. The mouse 20 is a movable handheld input device for providing user commands to a host system such as a computer. In most cases, the mouse 20 is configured to control movements such as a cursor and initiate commands via one or more clicking actions. The mouse 20 may be coupled to the host system via a wired or wireless connection. In the case of wired connections, the mouse 20 may include a cable for connecting to the host system. In the case of wireless connections, the mouse may include a radio frequency (RF) link, optical infrared (IR) link, Bluetooth link or the like in order to eliminate the cable.

The mouse 20 generally includes a housing 22 that provides a structure for moving the mouse 20 along a surface and for gripping the mouse 20 for movement thereof. The housing 22 also helps to define the shape or form of the mouse 20. That is, the contour of the housing 22 embodies the outward physical appearance of the mouse 20. The contour may be rectilinear, curvilinear or both. In most cases, a bottom member 24 of the housing has an external contour that substantially conforms to the contour of a flat surface such as a desktop. In addition, a top member 26 of the mouse housing 22 generally has an external contour that substantially conforms to the contour of the inside surface of a hand.

The housing 22 also provides a structure for enclosing, containing and/or supporting the components of the mouse 20. Although not shown, the components may correspond to electrical and/or mechanical components for operating the mouse 20. For example, the components may include a position detection mechanism such as a track ball or optical assembly that monitors the movement of the mouse 20 along a surface and that sends signals corresponding to the movements to the host system. In most cases, the signals produced by these components direct an input pointer to move on a display screen in a direction similar to the direction of the mouse 20 as it is moved across a surface. For example, when the mouse 20 is moved forward or backwards, the input pointer is moved vertically up or down, respectively, on the display screen. In addition, when the mouse 20 is moved from side to side, the input pointer is moved from side to side on the display screen.

The mouse 20 may be configured as a conventional mouse or a unibody mouse. If configured as a conventional mouse, the mouse includes one or more mechanical buttons that move relative to the top member of the housing 22. If configured as a unibody mouse, the functionality of a button (or buttons) is incorporated directly into the housing 22 of the mouse 20. For example, the top member 26 may pivot relative to the bottom member 24 (as opposed to attaching separate button caps through the housing). In either case, during a clicking action, the movable component of the mouse 20 (whether a mechanical button or a top member) is configured to engage a switch located within the housing. When engaged, the switch generates a button event signal that can be used to perform an action in the host system.

In the illustrated embodiment, the mouse is a unibody mouse. In this particular embodiment, the entire top member 26 is configured to pivot about an axis 28 located in the back of the mouse 20. The axis 28 may be provided by a pivot joint that connects the top and bottom members 26 and 24. This arrangement allows the front portion of the top member 26 to move downward when a force is applied on the front of the top member 26 (e.g., the top member swings around the axis 28). When forced downward, an inner surface of the top member 26 presses against the internal switch located within the housing 22 thereby generating the button event signal.

In order to increase the button functionality of the mouse 20 (while limiting breaks or lines in the housing), the mouse 20 may further include a plurality of button zones 30 on the surface of the housing 22. The button zones 30 represent regions of the housing 22 that may be touched or pressed to implement different button functions (with or without a clicking action). By way of example, the button functions may include making selections, opening a file or document, executing instructions, starting a program, viewing a menu, and/or the like.

The button zones 30 are generally provided by sensors located beneath the outer surface of the housing 22. The sensors are configured to detect the presence of an object such as a finger when a finger sits on, presses or passes over them. The sensors may also be capable of sensing the amount of pressure being exerted thereon. The sensors may be disposed underneath the inner surface of the housing 22 or they may be embedded in the housing 22 itself. By way of example, the sensors may be touch sensors and/or pressure/force sensors.

The position of the button zones 30 may be widely varied. For example, the button zones 30 may be positioned almost anywhere on the mouse 20, including both moving and stationary components of the mouse, so long as they are accessible to a user during manipulation of the mouse 20 (e.g., top, left, right, front, back). Furthermore, any number of button zones 30 may be used. Moreover, the button zones 30 may be formed from almost any shape and the size may vary according to the specific needs of each mouse. In most cases, the size and shape of the button zones 30 correspond to the size that allows them to be easily manipulated by a user (e.g., the size of a finger tip or larger). The size and shape of the button zones 30 generally corresponds to the working area of the sensor.

In accordance with one embodiment of the present invention, at least a portion of the button zones 30 are based on touch sensing. The touch sensing button zones 30A provide inputs when the user touches the surface of the mouse 20. The input signals can be used to initiate commands, make selections, or control motion in a display. The touches are recognized by a touch sensing device located underneath or within the housing 22. The touch sensing device monitors touches that occur on the housing 22 and produces signals indicative thereof. The touch sensing device may for example include one or more touch sensors based on resistive touch sensing, capacitive touch sensing, optical touch sensing, surface acoustic wave touch sensing, and/or the like.

In one embodiment, each of the touch sensing button zones 30A utilize capacitance sensors. The capacitance sensors may be in the form of electrodes or wires disposed underneath the outer surface of the housing 22. As the finger approaches the outer surface of the mouse 20, a tiny capacitance forms between the finger and the electrode/wires in close proximity to the finger. The capacitance in each electrode/wire is measured by a capacitance sensing circuit or by the main microcontroller of the mouse. By detecting changes in capacitance at each of the electrode/wires, the microcontroller can determine the presence or absence of a finger on a particular button zone 30A.

Although the touch sensing button zones 30A may be positioned anywhere on the mouse, in one embodiment, at least two touch button zones 30A are located on a physical button of the mouse 20 so as to increase the functionality of the physical button. For example, the touch button zones 30A may be positioned on a mechanical button in a conventional mouse or the top member 26 in a unibody mouse (as shown). In either case, both the physical buttons as well as the button zones 30A in the region of the press generate signals. That is, the switch of the physical button generates a first signal when the physical button is pressed, and the sensors of the button zones 30A in the region of the press generate additional signals. The signals generated by the switch and sensors may be interpreted in a variety of ways either separately or in combination, and may even be assignable by a user as for example using a preference window or control panel.

In one implementation, the button zones 30A are positioned on the left and right sides of a single physical button so that a single physical button can operate like conventional left and right mechanical buttons. The left and right button zones 30A help determine whether a single clicking action is a left or right clicking action. When a user presses on the left side of the single physical button (e.g., top member 26), two signals are generated, one from the switch, the other from the touch sensor located on the left side. These two states may be interpreted as a primary or left click button event. When a user presses on the right side of the single physical button (e.g., top member 26), two signals are generated, one from the switch, the other from the touch sensor located on the right side. These two states may be interpreted as a secondary or right click button event.

In the case where fingers press on both the right and left sides (simultaneous), three signals are generated, one from the switch, one from the touch sensor located on the left side and another from the touch sensor located on the right side. These three states may be interpreted in a variety of ways. For example, they may be interpreted as a primary or left button click, a third distinct button event or even alternating or simultaneous left and right button events. The last example may be beneficial in game playing where a user typically has to physically alternate between left and right clicks to perform an action in the game.

In one embodiment, a visual preview clue may be provided on-screen when a finger is lightly pressing one or both of the touch sensors. Lightly pressing may for example correspond to the condition when a finger is placed over the touch sensor, but the press is not hard enough to activate the main switch. The visual clue alerts a user to which button will be activated when the main switch is finally pressed (hard touch). The visual clue may for example be a menu icon when the secondary (right button) is touched, and an arrow icon when the primary (left button) is touched. Alternatively or additionally, the touch buttons may be illuminable touch buttons that illuminate when the touch button is lightly pressed thereby alerting the user as to which button will be activated.

In accordance with another embodiment of the present invention, at least a portion of the button zones 30B are based on pressure or force sensing. The force sensing button zones 30B provide inputs when forces are applied to the housing 22 of the mouse 20. The input signals can be used to initiate commands, make selections, or control motion in a display. In this embodiment, the housing 22 typically provides a slight amount of flex so that any forces exerted thereon can be distributed to a force sensing device located underneath the housing 22. The force sensing device monitors the forces on the housing 22 and produces signals indicative thereof. The force sensing device may for example include one or more force sensors such as force sensitive resistors, force sensitive capacitors, load cells, pressure plates, piezoelectric transducers, strain gauges and/or the like.

The force sensors may be attached to the under surface of the housing 22 or to a structural platform located within the housing 22. When a force is applied to the housing 22 (squeezing or pushing on the housing), the force is transmitted through the housing 22 to the force sensor located underneath the housing 22. That is, the housing 22 flexes minimally, but still enough to be sensed by the force sensor sandwiched between the housing 22 and the internal structural platform.

In one particular implementation, the force sensing button zones 30B are located on opposing sides of the housing 22 on the top member 26 or the bottom member 24. The sides of the housing 22 are ideal places for implementing a squeeze gesture. This is because the users fingers are typically positioned on one side of the mouse 20 and thumb on the other side of the mouse 20 and therefore the hand may easily squeeze the sides via a pinching action. The squeeze gesture can be used alone or simultaneously with button clicks and pointing. For example, the squeeze gesture can be used to initiate control functions such as zoom, pan, resize, volume control, and the like where the squeeze is a physical metaphor for the action itself.

The squeeze gesture may also be used in combination with traditional button clicks or pointing to modify the button clicks or pointing or to generate other control functions. For example, the squeeze gesture can be used with standard GUI functions in a way where increased pressure translates to a more intense level of the standard GUI function (e.g., a characteristic of the standard GUI function is based on the amount of pressure). By way of example, the speed of a standard GUI function may be related to the pressure being exerted on the sides of the mouse (e.g., faster scrolling with increased pressure and slower scrolling with decreased pressure).

Because it is so convenient to activate the squeeze gesture, special care must be taken when designing the squeeze feature so that it will not be accidentally activate during normal use, i.e., needs to be able to differentiate between light and hard squeezes. By way of example, the squeeze feature may be implemented using force sensitive sensors such as a force sensitive resistor (FSR) or capacitor (FSC). FSR's, exhibit a decrease in resistance with an increase in force applied to its active surface while FSC's exhibit an increase in capacitance with an increase in force applied to its active surface. A comparator circuit can be used to output a high signal to indicate activation when a preset force threshold is reached.

In one implementation, the squeeze gesture (pressing the sides of the mouse) is configured to control one or more features of a window management program such as Expose' manufactured by Apple Computer Inc. of Cupertino, Calif. Window management programs are configured to help navigate through or mitigate window clutter (the state where its is difficult to find documents or see the desktop because there are so many open windows and/or applications).

Expose' in particular has three different modes of operation, which can be controlled by the squeeze gesture. The first mode is All Windows or Tile, Scale and Show all. When operating in this mode, all open windows are tiled and scaled so that all the open windows can be seen simultaneously inside the display screen. That is, squeezing the sides of the mouse 20 instantly tiles all of the open windows—scales them down and neatly arranges them so that the user can view the contents in each window. The amount of scaling or the rate of scaling may be tied to the amount of pressure be exerted on the sides of the mouse 20. The second mode is Application Windows or Highlight Current Application. This mode works similarly to the first mode except that it only works on a particular application. For example, squeezing the sides of the mouse 20 may instantly tile the open windows of a particular application while causing all of the other open application to fade to a shade of grey. The third mode is Desktop or Hide All. In this mode, all of the open windows are moved to the screen edges thereby opening up the desktop. That is, squeezing the sides of the mouse 20 may hide all of the open windows giving the user instant access to their desktop.

In accordance with another embodiment of the present invention, the mouse 20 includes a jog ball 32. The jog ball 32 is configured to replace the conventional scroll wheel. Unlike the scroll wheel, the jog ball 32 is capable of rotating or spinning in multiple directions and therefore generating multidirectional signals similar to a track ball. Unlike a track ball, however, the jog ball 32 includes a much smaller ball that is sealed inside a housing. The smaller ball makes it easy to perform operations using one finger, and because the ball is sealed inside a housing this technique is less prone to dirt and dust (e.g., the ball does not have to be removed and cleaned). Furthermore, instead of using mechanical encoders as in track balls, the jog ball 32 utilizes a non contact magnetic configured ball and a hall IC. As the ball spins around, the hall IC detects the magnetic field of the spinning ball, and generates signals indicative thereof. In some cases, the jog ball 32 may even include a spring actuated switch that activates when the ball is pressed down. This may operate as a third button of the mouse.

The ball is preferably sized smaller than 10 mm, more particularly between about 5 and about 8 mm and even more preferably about 7.1 mm. The smaller ball is easily actuated by a single finger (unlike larger trackballs which are unwieldy for one finger), saves real estate of the mouse for the button zones (unlike large trackballs which take up most of the usable surface area), is more aesthetically pleasing (not as obtrusive as a track ball), and does not take up a large amount of space inside the mouse housing (unlike trackballs).

By way of example, the jog ball 32 may correspond to the WJN series jog ball switch manufactured by Panasonic Corporation of North America. The EVQWJN series jog ball in particular includes a switch and has overall dimensions of 10.7 mm×9.3 mm×6 mm with a 5.5 mm ball.

The placement of the jog ball 32 may be widely varied. In most cases, the placement is such that it can be easily manipulated by a finger when the hand is holding the mouse 20. In one particular embodiment, the jog ball 32 is positioned in front center of the mouse 20. For example, the jog ball 32 may be fixed to the housing 22 of the mouse 20 and positioned between the left and right mechanical buttons in a conventional mouse or fixed to the movable top member 26 between the left and right touch button zones 30A in a unibody mouse. Alternatively, the jog ball 32 may be positioned on the sides of the mouse 20.

In one embodiment, the jog ball 32 includes a switch. The jog ball switch is used in combination with the main switch of the unibody mouse 20 to implement a third button. For example, if the switch of the jog ball 32 and the main switch are activated together, a third button signal is generated. If one is activated and the other is deactivated, the third button signal is not generated. Generally speaking, in order to cause the third button to activate, the user has to provide enough force to press the jog ball 32 down as well as the top member 26 so that the top member 26 engages the main switch located inside the mouse 20.

In one embodiment, the jog ball 32, which spins freely inside a housing in all directions, is configured to provide a scrolling or panning function for the mouse 20 so that a user can move the GUI vertically (up and down), and horizontally (left and right) in order to bring more data into view on a display screen. For example, the jog ball 32 may be arranged to move the GUI vertically up when spun towards the front of the mouse 20, vertically down when spun towards the back of the mouse 20, horizontally to a right side when spun towards the right side of the mouse 20, and horizontally to a left side when spun towards the left side of the mouse 20.

In another embodiment, at least some of the signals generated by the jog ball 32 are used for scrolling/panning while the remaining signals are used for button events. For example, vertical scrolling may be implemented when the jog ball 32 is spun up and down, and a right button event or fourth button may be implemented when the jog ball is spun to the right, and a left button event or fifth button may be implemented when the jog ball is spun to the left. That is, the horizontal scroll/panning is disabled in order to enable additional button functionality while maintaining the vertical scroll/pan functionality.

In accordance with another embodiment of the present invention, because the input means (button zones and jog ball) may not provide sound feedback when activated (e.g., no mechanical detents), the mouse may further include an onboard speaker that provides an audible clicking noise when at least some of these devices are activated. The audible clicking noise may be distinct to each input mechanism, or the same clicking noise may be used. As should be appreciated the sound feedback enhances the usability of the mouse as the user is able to positively confirm that his action has resulted in an actual activation of the input mechanism. During operation, the microcontroller of the mouse sends a driving signal to the speaker when the appropriate input is received from the input mechanisms, and the speaker outputs one or more "clicks" in response to the driving signal.

Figure 2:
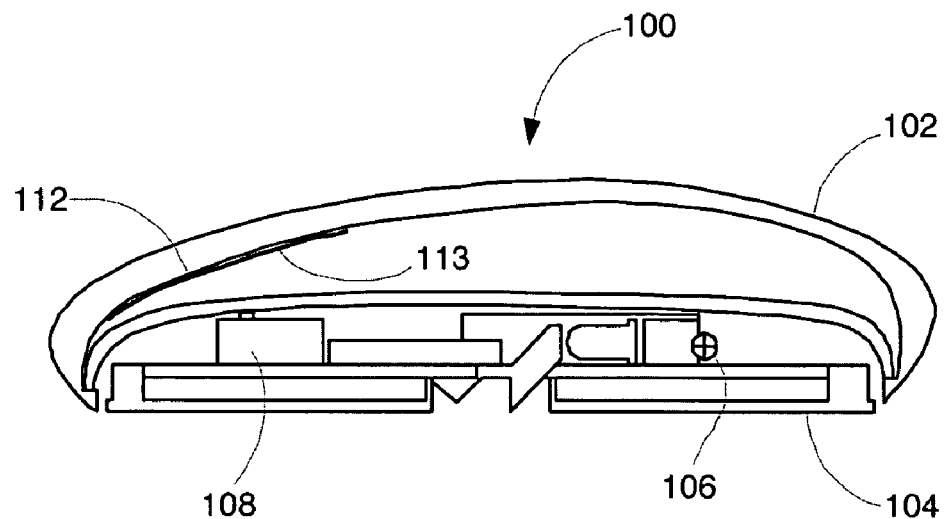
FIG. 2 is a side elevation view, in cross section, of a mouse, in accordance with one embodiment of the present invention.
Figure 3:
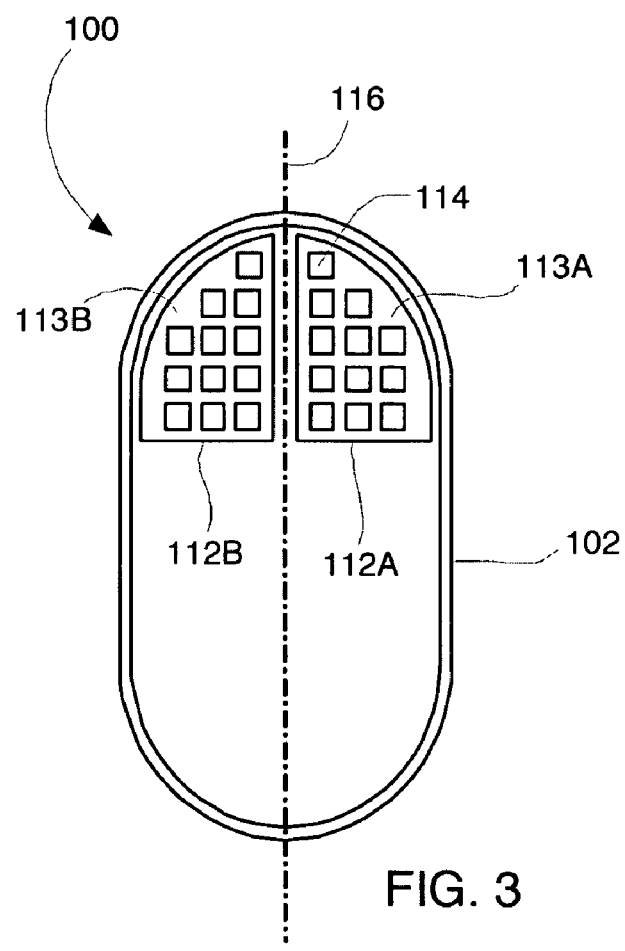
FIG. 3 is a bottom view of a top member of a mouse, in accordance with one embodiment of the present invention.

Referring to FIGS. 2 and 3, one embodiment of a unibody mouse 100 will be described in greater detail. The unibody mouse 100 may for example correspond to the mouse shown and described in FIG. 1.

As shown in FIG. 2, the unibody mouse 100 includes a plastic top shell 102 that pivots relative to a plastic base 104.

The pivot point 106 is typically located at the back of the mouse 100. This allows the front portion of the top shell 102 to move downward towards the base 104 when a force is applied on the front of the top shell 102 (e.g., the top shell swings around the pivot point). When the plastic top shell 102 is forced down at the front, it activates a main switch 108 that causes a microcontroller in the mouse 100 to send a button down event to a host computer. One embodiment of a unibody mouse such as this can be found in U.S. Pat. No. 6,373,470, which is herein incorporated by reference.

In order to provide additional inputs, the mouse 100 also includes capacitive sensors 112 that are placed at suitable locations across the top shell 102. The capacitive sensors 112 are configured to detect where portions of the hand, and more particularly one or more fingers, are contacting the surface of the mouse 100. Because the capacitive sensors 112 can detect fingers through a plastic surface of a several millimeters thick, the capacitive sensors 112 can be either embedded in the plastic top shell 102 or fixed to the underside of the plastic top shell 102 (as shown).

The capacitive sensors 112 may be widely varied. In one embodiment, the sensors 112 are in the form of conductive electrodes 113 that are operatively coupled to a capacitive sensing circuit that monitors the capacitance at each electrode 113. The capacitance sensing circuit may for example be a separate or integral component of the microcontroller of the mouse 100. The conductive electrodes 113 may be any thin metallic material. By way of example, the electrodes 113 may be embodied as a metallic foil such as copper foil tape that is adhered to the inner surface of the top shell 102, a conductive paint or ink that is coated on the inner surface of the top shell 102 (e.g., PET with silver ink), a flexible printed circuit (FPC) with copper print that is glued or taped to the inner surface of the top shell 102, a wire or band that is molded into the top shell 102, and/or the like.

The size, shape and position of the conductive electrodes 113 can be modified to increase the sensitivity of the electrodes 113. As a general guide, the static capacitance of the electrodes 113 (without the finger touching it) should be kept as small as possible. Furthermore, when a finger is touching the electrodes 113, the change in capacitance should be made as large as possible (the ratio of the capacitance between the two states should be maximized). In one implementation, the electrode configuration is configured to produce an increase of 3-5% in the electrode capacitance when a finger is touching the electrode. Some factors that affect the capacitance include but are not limited by: area of the electrodes, distance between electrodes and the thickness of the top shell. Each of these factors can be varied separately or in combination with each other to achieve the desired results. That is, it may be necessary to test different combinations of these parameters to reach an optimal design for a particular application.

In one embodiment, the surface area of the electrodes is reduced by removing sections from the electrodes 113. For example, the electrodes 113 may be configured with various holes or voids 114 that are randomly or symmetrically placed in the electrodes 113 (e.g., Swiss cheese). Alternatively, the electrodes 113 may be formed from rows and columns of woven or attached wires with spaces between the rows and columns (e.g., chain link or mesh).

Additionally or alternatively, the thickness of the electrode 113 may be reduced in order to increase the sensitivity of the electrodes 113. The thickness may for example be between about 0.2 and about 0.4 mm thick when using copper foil.

As shown in FIG. 3, which illustrates the underbelly of the top shell 102, the mouse 100 includes two capacitance sensing electrodes 113 that are spatially separated and positioned on opposite sides of the mouse 100. A first electrode 113A is placed on the front left side of the top shell 102 and a second electrode 113B is placed on a front right side of the top shell 102. That is, the first electrode 113A is placed to the left of the centerline 116 of the mouse 100, and the second electrode 113B is placed to the right of the centerline 116 of the mouse 100.

By placing the electrodes 113 at the front of the mouse in the left and right positions, the unibody mouse 100 can be operated like a conventional two button mouse. The signals generated by the main switch and left sensor 112A indicate a primary button event, and the signals generated by the main switch and the right sensor 112B indicate a secondary button event. To activate the primary button (left click), the user places their finger on the left side of the top shell 102 over the left electrode 113A and applies a force on the top shell 102 until the top shell 102 activates the main switch 108. Likewise, to activate the secondary button (right click), the user places their finger on the right side of the top shell 102 over the right electrode 11 3B, and activates the main switch 108 by applying a force on the top shell 102. One advantage of this configuration is that the force needed to activate the left and right buttons are the same.

As should be appreciated, the button detection algorithm requires two signals to be detected to determine whether the primary or secondary button is activated. For primary button detection, the left sensor 112A and main switch are activated. For secondary button detection, the right sensor 112B and main switch are activated. In cases where the left and right sensors as well as the main switch are activated, several different functions may be performed. In some cases, the user may want to activate the primary and secondary buttons at the same time (when playing a game that requires them to be used in this manner). In other cases, the user may want the mouse to interpret the two sensors and the main activation (at the same time) as primary button activation. In yet other cases, the user may want the mouse to interpret the two sensors and the main switch activation (at the same time) as a third button.

Alternatively, the position of the primary and secondary buttons can be reconfigured via software as necessary to suit a left or right handed person, i.e., a right handed person typically prefers the primary button to be on the left and a left handed person typically prefers the primary button on the right.

Alternatively or additionally, the sensors may operate independently from the switch. For example, the mouse may be configured with inputs that are created when the touch sensors are lightly touched so that the switch is not activated. A light touch on the left touch sensor may generate a second left button event, and a light touch on the right touch sensor may generate a second right button event. In a manner of speaking, the switch may be used to differentiate between light and hard touches.

A control panel may be provided in the host system to let a user choose how the sensors/switches are to be interpreted.

In most cases, the capacitive sensing method mentioned above relies on a change in capacitance at the electrodes caused by the introduction of a finger on the sensor. The human body is essentially a capacitor and adds to the electrode capacitance when the finger touches it with the return path being the ground (floor) the person is standing on or any part of the body that touches a ground. Because there are instances where a person may not have a ground path back to the mouse/computer system, e.g. sitting with legs folded on a plastic chair, the capacitance sensor design may be configured with a pair of capacitive electrodes on each side of the mouse in the touch area, e.g., front of mouse. With at least two electrodes per side, the "floating finger" provides a capacitive coupling between them thus causing a change in capacitance. That is, the floating finger forms a coupling between the two electrodes, and this will add to the capacitance of the electrodes, which then can be interpreted as a finger is present.

Figure 4:
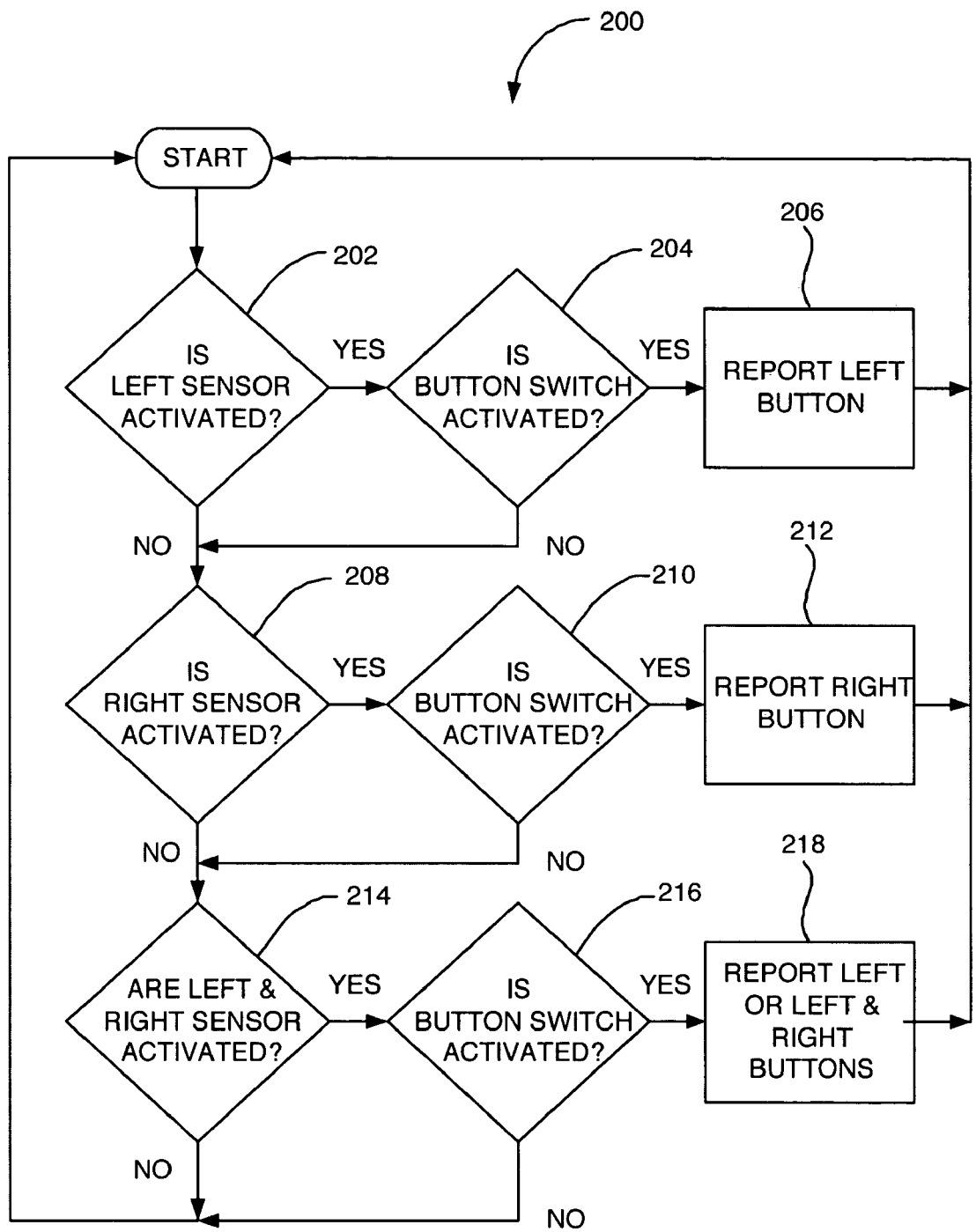
FIG. 4 is a mouse method, in accordance with one embodiment of the present invention.

FIG. 4 is a mouse method 200, in accordance with one embodiment of the present invention. The mouse method may be performed on the mouse described in FIGS. 2 and 3. The mouse method 200 begins at block 202 where a determination is made as to whether or not the left sensor is activated. If the left sensor is activated, the method proceeds to block 204 where a determination is made as to whether or not the main switch is activated. If the main switch is activated, the method proceeds to block 206 where a left button event is reported.

If the left sensor or main switch is not activated, the method proceeds to block 208 where a determination is made as to whether or not the right sensor is activated. If the right sensor is activated, the method proceeds to block 210 where a determination is made as to whether or not the main switch is activated. If the main switch is activated, the method proceeds to block 212 where a right button event is reported.

If the right sensor or main switch is not activated, the method proceed to block 214 where a determination is made as to whether or not the right and left sensors are simultaneously activated. If the sensors are simultaneously activated. The method proceeds to block 216 where a determination is made as to whether or not the main switch is activated. If the main switch is activated, the method proceeds to block 218 which has several possible outcomes depending on the user's needs. The outcomes may be selectable by the user via a control panel.

In one embodiment, block 218 includes only reporting only a left or right button event. In another embodiment, block 218 includes reporting both left and right button events (simultaneously or alternating). In yet another embodiment, block 218 may include reporting a third button event. If the right and left sensor or main switch is not activated, the method proceeds back to the beginning and starts over.

Figure 5:
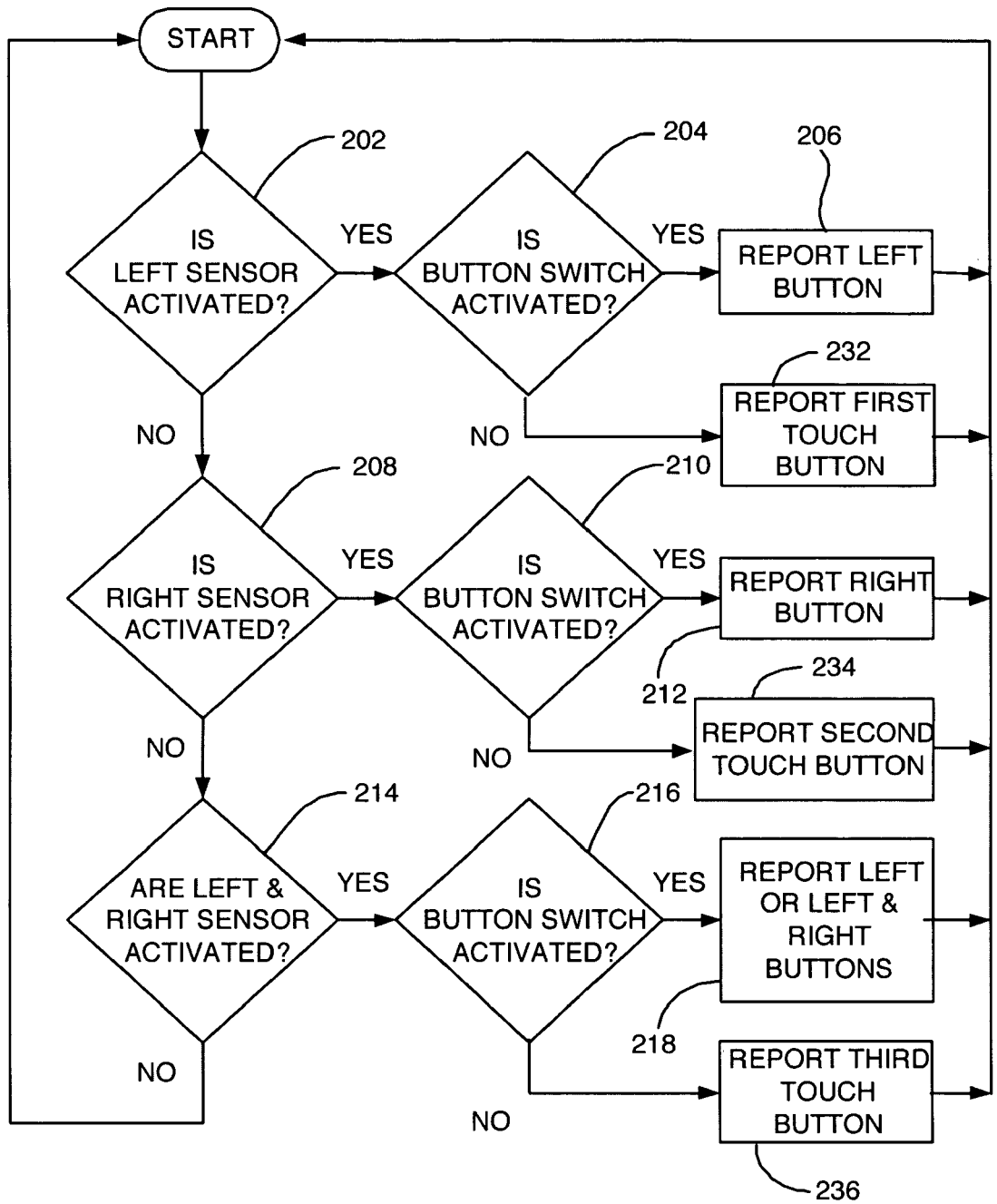
FIG. 5 is a mouse method, in accordance with one embodiment of the present invention.

FIG. 5 is a mouse method 230, in accordance with one embodiment of the present invention. This method is similar to the method of FIG. 4, with the exception that if a determination is made that there is no click, additional button events are reported based on only the various touches. For example, if the left sensor is activated, and the right sensor and main switch are not activated, the method proceeds to block 232 where a first light touch button event is reported. If the right sensor is activated, and the left and sensor and main switch are not activated, the method proceeds to block 234 where a second light touch button event is reported. If the left sensor and the right sensor are activated and the main switch is not, the method proceeds to block 236 where a third light touch button event is reported.

Figure 6:
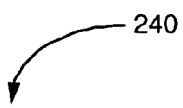
FIG. 6 is a mouse vocabulary table, in accordance with one embodiment of the present invention.

FIG. 6 is an example of a the mouse vocabulary table 240 based on methods described in FIGS. 4 and 5. As shown, the table 240 includes the signals produced by the main switch, left sensor and right sensor as well as what is reported when the various signals are activated or deactivated.

Figure 7:
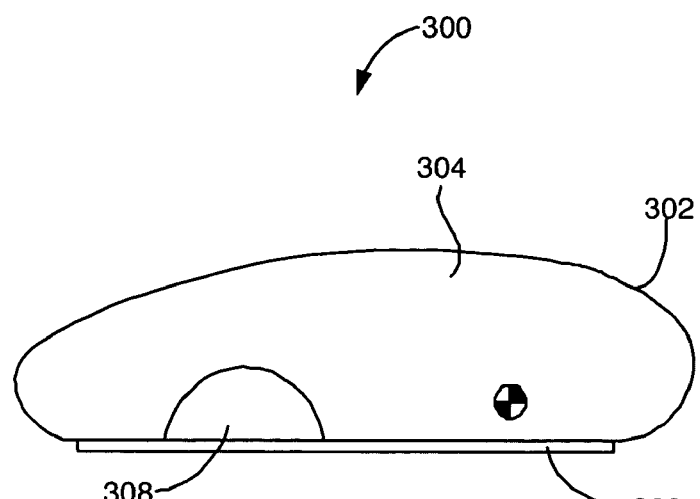
FIG. 7 is a side view of a mouse, in accordance with one embodiment of the present invention.
Figure 8:
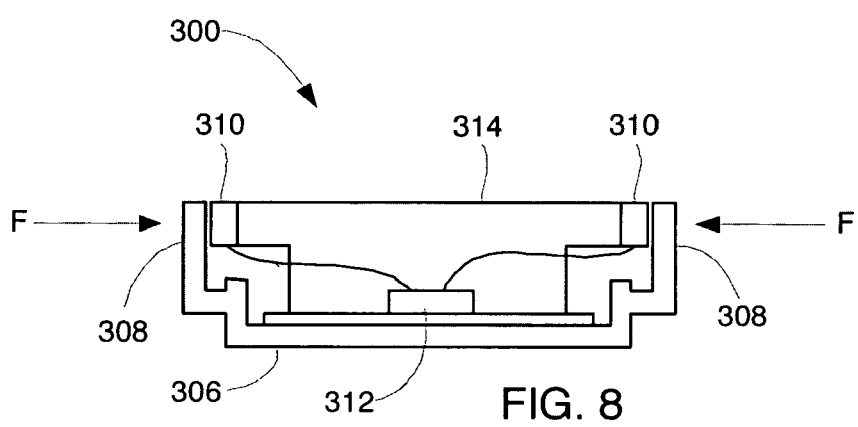
FIG. 8 is a front view, in cross section, of a mouse, in accordance with one embodiment of the present invention.

Referring to FIGS. 7 and 8, one embodiment of a unibody mouse 300 will be described in greater detail. The unibody mouse 300 may for example correspond to the mouse shown and described in FIG. 1. Similar to the unibody mouse mentioned in FIGS. 2 and 3, the unibody mouse of FIGS. 7 and 8 includes a housing 302 having a top member 304 that pivots relative to a base 306 in order to activate an internal switch (not shown).

The housing 302 additionally includes wings 308 positioned at both sides of the mouse 300. The wings 308 are an extension of the base 306 and are separate from the top member 304. The wings 308, which extend above the base 306 and into the sides of the top member 304, are typically flush with the outer surface of the top member 304. Although in some instances the wings 308 may be recessed or protrude away from the outer surface of the top member 304. The wings 308 allow a user to hold the mouse 300 with their finger and thumb so that the mouse 300 can be moved about a surface without tilting the top member 304. The wings 308 also allow the user to hold the internal switch closed (top member down) while lifting and moving the mouse 300. This operation is commonly used in situations where the user needs to move the cursor across the display screen and has very little workspace to move the mouse 300. This is sometimes referred to as a "lift and drag" operation.

Because the fingers and thumb are usually at the wings 308 or in close proximity to the wings 308 when the mouse 300 is being held, the wings 308 are ideal locations for implementing one or more input features. The user can press one or both of the wings 308 in order to generate various inputs. In fact, the wing buttons can work similarly to the touch buttons mentioned above. In one embodiment, each of the wings produces a separate input when pressed. In another embodiment, pressing on one or both of the wings produces the same control signal. The later arrangement can accommodate almost any hand position including conventionally at the sides of the mouse or unconventionally such as transverse to the conventional position or on only one side of the mouse.

In one embodiment, the input features are implemented with force sensors 310, and more particularly force sensitive resistors or capacitors, that are positioned behind the wings 308 and that produce data that varies according to the pressure exerted on the wings 308 when the wings 308 are pressed. The data (e.g., changes in resistance, capacitance, etc.) may be used to produce binary control inputs such as on/off or activate/deactivate via control circuitry. This may be accomplished when a predetermined force threshold is reached. Alternatively, the data may be used to produce variable control inputs that vary according to the force being applied. In either case, the mouse 300 typically includes a microcontroller 312 that monitors the output of the force sensors 310 and generates signals indicative thereof.

As shown in FIG. 8, the wings 308 extend above the surface of the base 306 and therefore they act like flexures that are capable of bending inwardly when a force is applied thereto (slight amount of flex). Furthermore, the sensors 310 are positioned between the inner surface of the wings 308 and a bridge 314 located within the housing 302. The bridge 314 may for example be a rigid piece of plastic that is attached directly or indirectly to the base 306. The sensors 310 may float between the bridge 314 and wings 308 or the sensors 310 may be attached to either the wings 308 or the bridge 314 (as shown).

When a force is applied to the wings 308 as for example by the pinching nature of the hand, the wings 308 flex inwardly and press against the sensors 310, which abut a flat surface of the bridge 314. The FSRs exhibit a decreased resistance with increasing levels of force while the FSCs exhibit an increased capacitance with increasing levels of force. The data generated therefrom may be used to produce control inputs based on the force applied at the wings 308.

When the input feature is operated as a binary input device, the microcontroller 312 is configured to produce binary inputs such as on/off based on a particular resistance of the FSRs or a particular capacitance of the FSCs. In the case of FSRs, if the resistance falls below a certain level, then the microcontroller 312 may treat the squeeze as a button event.

In the case of FSCs, if the capacitance rises above a certain level, then the microcontroller 312 may treat the squeeze as a button event. In some cases, a comparator circuit may be used to output a high signal that indicates button activation when a preset force threshold is reached. In fact, the mouse 300 may include two activation force thresholds, one for normal operations and one for lift and drag operations.

When the input feature is operated as a variable input device, the microcontroller 312 is configured to produce variable inputs that vary according to the resistance of the FSRs or the capacitance of the FSCs.

In one particular embodiment, the force sensors 310 correspond to FSCs. FSCs tend to be more cost effective than FSRs, and in cases where the mouse includes both the squeeze feature and the capacitive touch sensors previously described (FIGS. 2 and 3), the same capacitance sensing circuit can be used to monitor the capacitance at the capacitance touch sensors and the capacitance force sensors.

In one implementation, the FSCs consist of parallel conductive plates separated by one or more deformable spacers. When the sensor is pressed, the distance between the plates becomes smaller thereby increasing the capacitance, which is read by the capacitance sensing circuit and thereafter reported to the microcontroller of the mouse.

Figure 9:
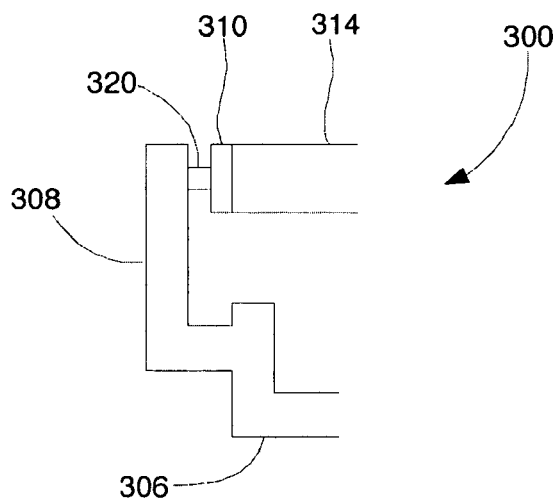
FIG. 9 is a front view, in cross section, of a mouse, in accordance with one embodiment of the present invention.

As shown in FIG. 9, the inner surface of the wings 308 may include a plunger or nub 320 that presses against the sensors 310 when the wings 308 are forced inwardly rather than having a flat surface as shown in FIG. 8. The plunger 320, which protrudes from the inner surface, helps transmit the force from the wings 308 to the sensors 310 thereby enhancing the operation of the sensors 310. Alternatively, the plunger 320 may be placed on the flat surface of the bridge 314.

Although not shown, in some cases, in order to ensure that the input features work properly when squeezed, a shim may be needed to fill gaps or spaces found between the sensors 310 and the wings 308 or between the sensors 310 and the bridge 314.

Figure 10:
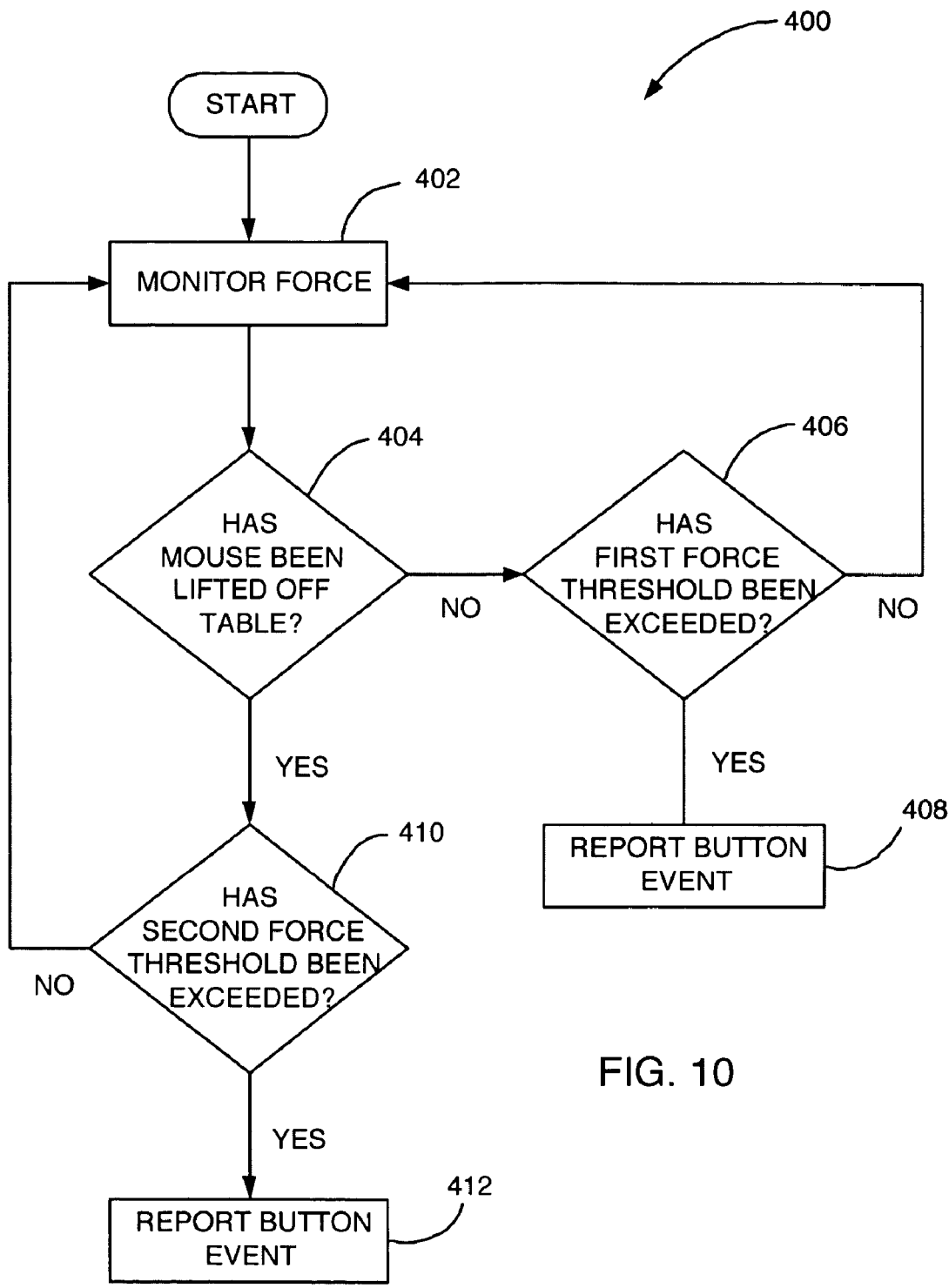
FIG. 10 is a mouse method, in accordance with one embodiment of the present invention.

FIG. 10 is a mouse method 400, in accordance with one embodiment of the present invention. The mouse method 400 generally begins at block 402 where the force at the sides of the mouse are monitored. This may be accomplished using the arrangement shown in FIGS. 7 and 8.

Following block 402, the method proceeds to block 404 where a determination is made as to whether or not the mouse has been lifted off the table (e.g., lift and drag operation). This may be accomplished by polling the surface quality (SQUAL) value from the optical tracking sensor of the mouse. The optical tracking sensor uses an optical navigation technology that measures changes in position by optically acquiring sequential surface images and mathematically determining the direction and magnitude of the changes. The sensor provides a SQUAL value that is a measure of the number features on the surface that is visible to the sensor. When the mouse is on a work surface, the sensor sees features of the work surface and thus it returns a non-zero for the SQUAL value. When the mouse is lifted off the table, the sensor does not see any features on the work surface and thus it returns a zero for the SQUAL value.

If the mouse has not been lifted off the table, the method 400 proceeds to block 406 where a determination is made as to whether or not a first force threshold has been exceeded. The first force threshold is set at a force level that is higher than the force typically required to hold the sides of the mouse during normal use. As should be appreciated, the use force is typically very low compared to a force associated with a squeeze. If the first force threshold is exceeded, the method proceeds to block 408 where a button event is generated. If the first force threshold is not exceeded, the method proceeds back to block 402.

Referring back to block 404, if it is determined that the mouse has been lifted off the table, then the method proceeds to block 410 where a determination is made as to whether or not a second force threshold has been exceeded. The second force threshold is set at a force level that is higher than the force required to hold the mouse during a lifting operation. As should be appreciated, the lifting force is typically much higher than the first force described above. If the second force threshold has been exceeded, the method proceeds to block 412 where a button event is generated. If the second force threshold is not exceeded, the method proceeds back to block 402.

Using the implementation of the optical tracking sensor, when the force exerted on the sides of the mouse is greater than the first force and the SQUAL value is non zero, this is an indication that the user is performing a squeeze gesture at the sides of the mouse during normal use and that a button event should be generated. When the force exerted on the wings is greater than the second force and the SQUAL value is zero, this is an indication that the user is performing a squeeze gesture at the sides of the mouse during a lift and drag operation and that a button event should be generated.

Figure 11:
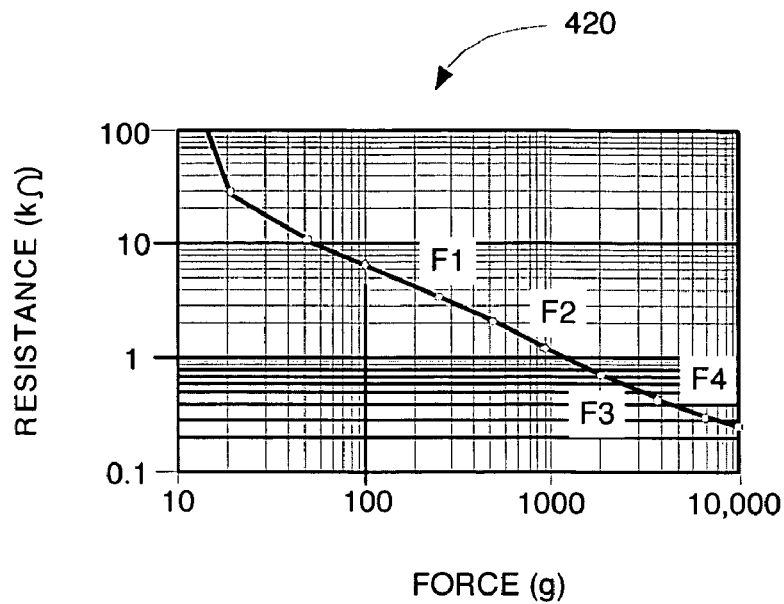
FIG. 11 is a graph illustrating resistance verses force, in accordance with one embodiment of the present invention.

FIG. 11 is a resistance verses force diagram 420 of an FSR, in accordance with one embodiment of the present invention. Several force thresholds are shown. F1 is the force at the sides of the mouse during normal usage. F2, which is greater than F1, is the force required to activate the squeeze button when the mouse is on a work surface. F3, which is greater than F2, is the force at the sides of the mouse when performing a lift and drag operation. F4, which is greater than F3, is the force required to activate the squeeze button during the lift and drag operation.

Figure 12:
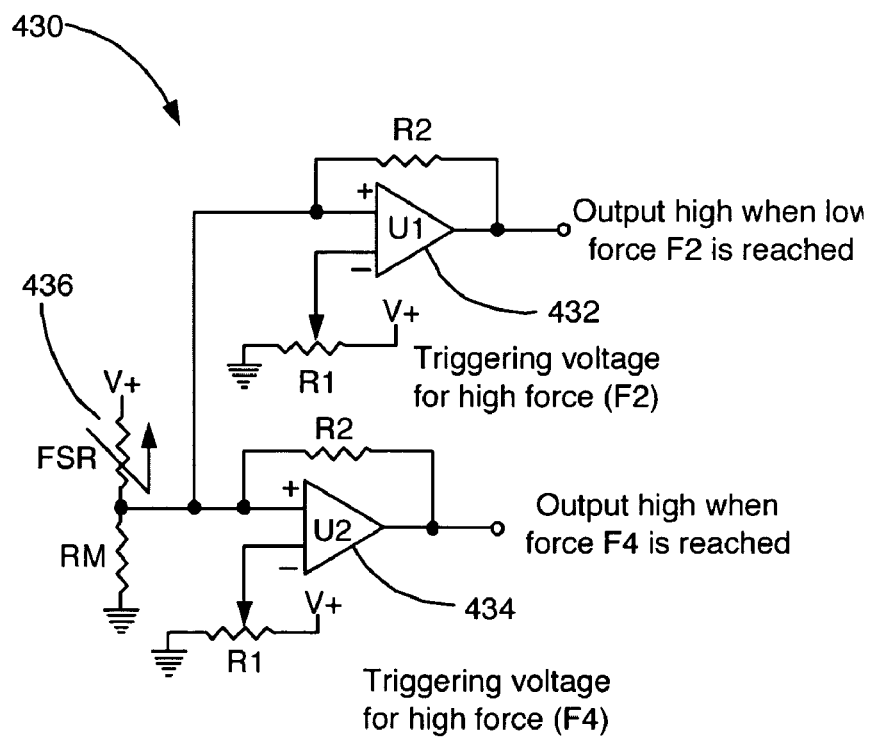
FIG. 12 is a block diagram of a force sensing circuit, in accordance with one embodiment of the present invention.

FIG. 12 is diagram of a comparator circuit 430, in accordance with one embodiment of the present invention. The comparator circuit 430 is configured to output a "high" signal when the low force F2 and the high force F4 thresholds are reached. The comparator circuit 430 includes two comparators U1 and U2 (432 and 434), each of which are connected to an FSR 436. The triggering voltages of the comparators 432 and 434 are set at voltages that correspond to low force threshold U1 and high force threshold U2. When the force threshold is reached, the comparator circuit 430 outputs a "high" signal. This signal is fed to a microcontroller that also monitors SQUAL signals from an optical tracking sensor. When the appropriate signals are received, the microcontroller outputs a button event signal to the host system. In some cases, the triggering voltages at U1 and U2 can be made adjustable through the use of a digital to analog converter DAC in the microcontroller. As a result, the user and/or the host system can adjust the force thresholds to better fit the user.

Figures 13, 14:
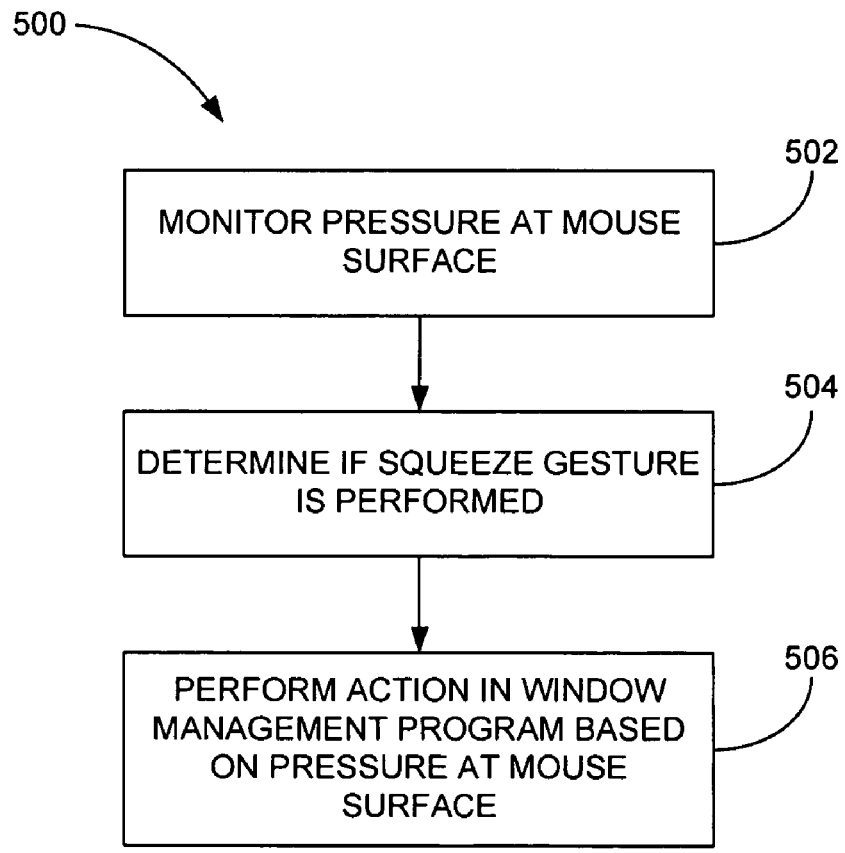
FIG. 13 is a table of outputs, in accordance with one embodiment of the present invention.
FIG. 14 is a mouse method, in accordance with one embodiment of the present invention.

FIG. 13 is a truth table 440 for determining button activation, in accordance with one embodiment of the present invention. As shown, the table includes off table detect signals, high force F4 signals, low force F2 signals and the button activation.

FIG. 14 is a GUI operational method 500, in accordance with one embodiment of the present invention. The method begins at block 502 where the pressure at the mouse surface is monitored. This may for example be performed by the force sensing buttons described above. In one particular embodiment, the pressure is monitored at one side of the mouse, and more particularly at both sides of the mouse. The increased pressure at the sides may be due to a squeeze gesture being performed. A squeeze gesture may for example may be defined as a pinching action that is performed on the mouse between at least two fingers.

Following block 502, the method 500 proceeds to block 504 where a determination is made as to whether or not a squeeze gesture has been implemented at the surface of the mouse. For example, whether or not a predetermined force threshold has been reached.

Following block 504, the method proceeds to block 506 where an action is performed in a window management program (or other program) based on the pressure at the mouse surface. The action may be widely varied. In one implementation, the action includes tiling and scaling down all the open windows so that all the open windows can be seen simultaneously inside the display screen. In another implementation, the action includes tiling and scaling down all the open windows associated with a particular application while removing the remaining windows from the foreground (e.g., gray them out). In yet another implementation, the action includes moving all the opening windows to the screen edges thereby giving the user instant access to their desktop.

The manner in which the action takes place may be based on the monitored pressure. In some cases, the rate of scaling is based on the pressure exerted at the surface of the mouse. For example, the rate of scaling may be increased with increased pressure (or vice versa). In other cases, the size of the tiles may be based on the pressure exerted at the surface of the mouse. For example, increased pressure may cause smaller tiles to be generated (or vice versa).

Figure 15:
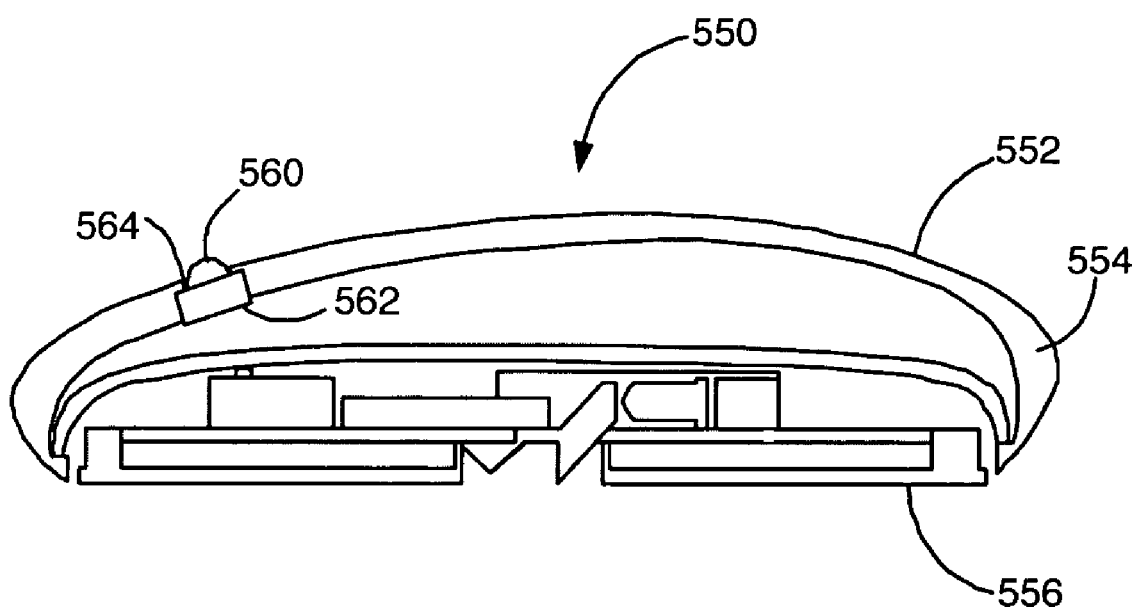
FIG. 15 is a side elevation view, in cross section, of a mouse, in accordance with one embodiment of the present invention.

Referring to FIG. 15, one embodiment of a unibody mouse 550 will be described in greater detail. The unibody mouse 550 may for example correspond to the mouse shown and described in FIG. 1. Similar to the unibody mouse mentioned in FIGS. 2 and 3, the unibody mouse of FIG. 15 includes a housing 552 having a top member 554 that pivots relative to a base 556 in order to activate an internal switch (not shown). As shown in FIG. 15, a jog ball 560 is situated in a sealed housing 562 and the sealed housing 562 is mounted on the inside surface of the top member 554. The top member 554 includes an opening or hole 564 for receiving the jog ball 560 which extends out of the sealed housing 562, and which extends above the top surface of the top member 554 so that it can be easily spun by a user when the user is holding the mouse. Because the jog ball 560 is smaller than a finger tip, the jog ball 560 is easy to maneuver with a single finger, and without repositioning the hand. In addition, the jog ball including the sealed housing does not take up a lot of space inside the mouse 550.

Figure 16:
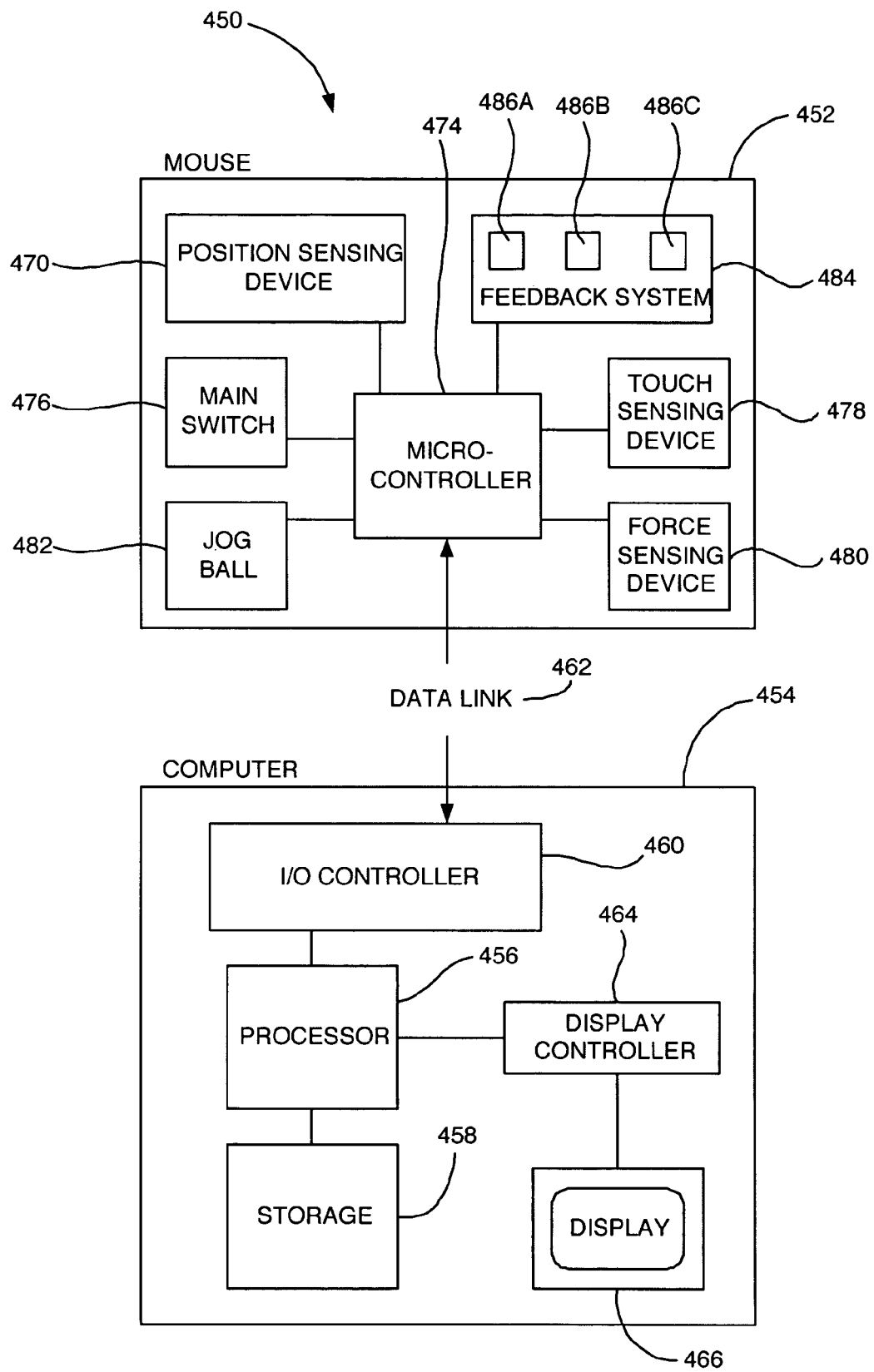
FIG. 16 is a block diagram of a mouse, in accordance with one embodiment of the present invention.

FIG. 16 block diagram of a computing system 450, in accordance with one embodiment of the present invention. The system 450 includes a mouse 452 and a computer 454 such as a desktop computer, lap top computer, hand held computer, and the like. By way of example, the computer 454 may correspond to any Apple or PC based computer. The computer 454 generally includes a processor 456 configured to execute instructions and to carry out operations associated with the computer system 450. For example, using instructions retrieved for example from memory, the processor 456 may control the reception and manipulation of input and output data between components of the computing system 450. The processor 456 can be a single-chip processor or can be implemented with multiple components.

In most cases, the processor 456 together with an operating system operates to execute computer code and produce and use data. The computer code and data may reside within a program storage 458 block that is operatively coupled to the processor 456. Program storage block 458 generally provides a place to hold data that is being used by the computer system 450. By way of example, the program storage block 458 may include Read-Only Memory (ROM), Random-Access Memory (RAM), hard disk drive and/or the like. The computer code and data could also reside on a removable program medium and loaded or installed onto the computer system when needed. Removable program mediums include, for example, CD-ROM, PC-CARD, floppy disk, magnetic tape, and a network component.

The computer 454 also includes an input/output (I/O) controller 460 that is operatively coupled to the processor 456. The (I/O) controller 160 may be integrated with the processor 456 or it may be a separate component as shown. The I/O controller 460 is generally configured to control interactions with one or more I/O devices (e.g., mouse 452) that can be coupled to the computer 454. The I/O controller 460 generally operates by exchanging data between the computer 454 and the I/O devices that desire to communicate with the computer 454. The I/O devices and the computer 454 typically communicate through a data link 462. The data link 462 may be a one way link or two way link. In some cases, the I/O devices may be connected to the I/O controller 160 through wired connections. In other cases, the I/O devices may be connected to the I/O controller 160 through wireless connections. By way of example, the data link 162 may correspond to PS/2, USB, IR, RF, Bluetooth or the like.

The computer 454 also includes a display controller 464 that is operatively coupled to the processor 456. The display controller 464 may be integrated with the processor 456 or it may be a separate component as shown. The display controller 464 is configured to process display commands to produce text and graphics on a display device 466. The display device 466 may be integral with the computer or it may be a separate component of the computer 454. By way of example, the display device may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like.

The mouse 452, on the other hand, generally includes a microcontroller 474 configured to acquire data from the various input mechanisms and to supply the acquired data to the processor 456 of the computer 454. In one embodiment, the microcontroller 474 is configured to send raw data to the processor 456 so that the processor 456 processes the raw data. For example, the processor 456 receives data from the microcontroller 474 and then determines how the data is to be used within the computer system 452. In another embodiment, the microcontroller 474 is configured to process the raw data itself. That is, the microcontroller 474 reads the pulses from the input mechanisms and turns them into data that the computer 454 can understand. By way of example, the microcontroller 474 may place the data in a HID format (Human Interface Device).

The microcontroller 474 may be embodied as one or more application specific integrated circuit (ASIC) that are configured to monitor the signals from the input mechanism, to process the monitored signals and to report this information to the processor (e.g., x, y, button, left, right, etc.). By way of example, this may be implemented through Firmware.

The mouse 452 also includes a position sensing device 470 which is operatively coupled to the microcontroller 474. The position sensing device 470 is configured to generate tracking signals when the mouse 452 is moved along a surface. The tracking signals may be used to control the movement of a pointer or cursor on the display screen 466. The tracking signals may be associated with a Cartesian coordinate system (x and y) or a Polar coordinate system (r, θ). By way of example, the position sensing device 170 may correspond to a conventional trackball or optical assembly.

The mouse 452 also includes a main switch 476 that is operatively coupled to the microcontroller 474. The main switch 476 is configured to generate a button event when the mouse performs a clicking action, as for example, when the top shell is moved relative to the base in a unibody design.

The mouse 452 may further include a touch sensing device 478 that is operatively coupled to the microcontroller 474. The touch sensing device 478 is configured to generate touch signals when the hand is positioned over or on the mouse 452. The signals may be used to differentiate between left and right clicking actions. The touch sensing device may for example be arranged similarly to that described above.

The mouse 452 may additionally include a force sensing device 480 that is operatively coupled to the microcontroller 474. The force sensing device 480 is configured to generate force signals when the hand exerts pressure on the mouse 452. The signals may be used to initiate a button event. The force sensing device may for example be arranged similarly to that described above.

Moreover, the mouse 452 may include a jog ball 482 that is operatively coupled to the microcontroller 474. The jog ball 482 is configured to generate multidirectional tracking signals when the ball is rotated within a housing. The jog ball 482 may also be configured to generate a button event when the ball is pressed. The jog ball may for example be arranged similarly to that described above.

Because the touch sensing devices 478, force sensing devices 480 and jog ball 482 may not provide any feedback when activated (e.g., no mechanical detents), the mouse 452 may further include a feedback system 484 configured to provide feedback to the user of the mouse 452 so that the user is able to positively confirm that his action has resulted in an actual activation of an input mechanism as for example one or more of the input mechanisms described above (e.g., touch sensing device 478, force sensing device 480, jog ball 482, etc.). The feedback system 484, which is operatively coupled to the microcontroller 474, includes one or more feedback generators 486 including audio feedback devices 486A, haptics devices 486B and/or visual feedback devices 486C. Each of the various feedback generators 486 provides a different kind of feedback to the user when an input is made. Audio devices 486A provide sound, haptics devices 486B provide tactile forces, and visual devices 486C provide visual stimuli. There may be a single feedback generator or multiple feedback generators that are used by all the input devices when an action is made, or alternatively, there may be a feedback generator or multiple feedback generators for each input device. That is, each input device may include its own dedicated feedback generators.

In the case of audio feedback generators 486A, the mouse 452 may include on-board speakers or buzzers such as a piezo electric speaker or a piezo electric buzzer. These devices are configured to output a clicking noise when a user performs an action as for example when a user touches one of the touch sensing devices 478, squeezes the presses against the force sensing devices 480 or spins the jog ball 482. This feature enhances the user's experience and makes each of these input devices feel more like mechanical input devices.

In one embodiment, the mouse 452 includes a single speaker for generating a clicking or other related sound. The single speaker, which can be mounted to the main printed circuit board inside the housing of the mouse 452, is tied to at least the jog ball 482, and in some cases tied to the force sensing device 480. As should be appreciated, the touch sensing devices 478 typically do not require a click since a click is already provided by the main switch 476. It should be pointed out however that in cases where a light touch also produces an input (without the main switch activating) then a click or other sound may be provided by the speaker. The speaker may be configured to output the same clicking sound for each input device, or alternatively the speaker may be configured to output different sounds for each input device. For example, clicks, clocks, and beeps may be used. The different sounds may be user selectable.

During operation, the microcontroller 474 sends driving signals to the speaker when the appropriate input is received from the input devices, and the speaker outputs one or more sounds in response to the driving signals. With buttons, a single click is typically provided although a click my be provided at touchdown and a clock may be provided on lift off. In some cases, the feedback may be tied to the level of force being applied to the force sensing device 480. For example, the clicking sound may be provided when a certain force threshold is reached, or the volume or pitch of the clicking sound may vary according to the level of force. With the jog ball 482, clicks are continuously provided while the ball is spinning. There is typically a click for each count, i.e., the number of points that are measured in a given rotation (360 degrees). The rate of clicking sounds typically increases as the rate of spinning increases, and decreases as the rate of spinning decreases or slows down. Hence, the clicking sounds provide audio feedback to the user as to the rate at which the ball is spun.

Additionally or alternatively, the mouse 452 may include a haptics mechanism 486B. Haptics is the science of applying tactile sensation and control to soft devices that do not include any tactile feel. Haptics essentially allows a user to feel information, i.e., controlled vibrations are sent through the housing of the mouse in response to a user action. The haptics mechanism 486B may include motors, vibrators, electromagnets, all of which are capable of providing force feedback in the form of controlled vibration or shaking. In the instant case, the haptics mechanism 486B may be used to enhance the feel of actuating one of the input devices of the mouse 452 including for example the jog ball 482, force sensing device 480 or touch sensing device 478. By way of example, the haptics mechanism 486B may be configured to generate impulsed vibrations when a user touches the touch sensing devices (soft or hard), presses against the force sensing devices 480 or spins the jog ball 482. This particular feature enhances the user experience and makes the input devices feel more like mechanical devices.

The haptics mechanism 486B may be centrally located or regionally located across the mouse 452. If regionally located, the mouse 452 may include a haptics mechanism 486B at each of the input devices so as to provide force feedback in the area of the user action. It is generally believed that the closer the vibration is to the user action, the greater the haptics effect. By way of example, the mouse 452 may include a haptics mechanism underneath the housing in the area of each the input devices.

In some cases, the audio and tactile feedback may be provided by the same device. For example, a tactile click generator may be used. The tactile click generator generally includes a solenoid that causes a plunger to tap a rib inside the mouse housing. The tap provides both a tactile feel in the form of vibration and a tapping sound that is similar to a click.

Additionally or alternatively, the mouse 452 may include visual feedback generators 486C configured to provide visual information at the surface of the mouse 452. Like the feedback generators described above, the visual feedback generators 486C may be singular to the mouse 452 or regionally located at each input device. By way of example, the visual feedback generators 486C may be light devices, such as light emitting diodes (LEDs), that are illuminated when an event occurs as for example when a user touches the touch sensing device (soft or hard), presses against the force sensing devices 480 or spins the jog ball 482. The illumination may be static or dynamic. If dynamic, the illumination may blink or cycle with increasing or decreasing intensity, and in some cases may even change colors in order to provide more detailed information about the event that is being monitored. By way of example, the illumination may be tied to the level of force being applied to the force sensing devices 480.

The light devices may be conventional indicators that include a small plastic insert, which is located in front of the LED, and which is inserted within an opening in the mouse housing thus causing it to exist at the surface of the mouse housing. The LED itself may also be placed in the opening in the mouse housing rather than using an insert. Alternatively, the light device may be configured not to break the surface of the mouse housing. In this configuration, the light source is disposed entirely inside the mouse housing and is configured to illuminate a portion of the mouse housing thereby causing the housing to change its appearance, i.e., change its color. Examples of illuminated surfaces can be found in U.S. patent Ser. Nos: 10/075,964, 10/773,897 and 10/075,520, which are all herein incorporated by reference. Alternatively, the visual feedback generators 486C may be embodied as electronic inks or other color changing surfaces.

In one embodiment, the mouse 452 provides visual feedback in the area of touches as for example the left and right touch buttons, and the two side force buttons when the touches occur. When a user presses on the left touch button, the left side of the mouse in the region of the touch surface changes color thereby alerting the user that a left button event has been selected, and when a user presses on the right touch button, the right side of the mouse in the region of the touch surface changes color thereby alerting the user that a right button event has been selected. The same implementation can be made for the wings of the force buttons when the they are pressed in by the user. In some cases, the wings may even change shades of color based on the level of force being applied at the wings during a squeeze event.

Each of the feedback generators may be used solely or in combination with one other. For example, when used together, in response to squeezing the force buttons on the side of the mouse, the speaker 486A may provide audio feedback in the form of a click, the haptics mechanism 486B may provide force feedback in the form of vibration, and the visual feedback mechanism 486C may provide visual stimuli in the form of light to alert a user that an input has been made. Again, the feedback may be provided at some central location or regionally at each of the force buttons.

Although the feedback systems have been primarily described as devices that provide feedback in response to activation of the input devices of the mouse, it should be noted that they also may provide feedback in response to something that happens in the host system. For example, during a scrolling event, the host system may send a sound command to the mouse when the user has reached a boundary such as a top or border of the content being viewed on the display screen. The microcontroller sends a driving signal to the speaker in response to the sound command, and the speaker generates a sound in response to the driving signal. The sound informs the user that they reached the border.

It should also be pointed out that the feedback may be provided by the host system rather than the mouse. For example, the host system may include a speaker that provides a click when the mouse buttons are utilized or a display that can visually alert a user when the mouse buttons are being utilized.

In one embodiment, program storage block 458 is configured to store a mouse program for controlling information from the mouse 452. Alternatively or additionally, a mouse program or some variation thereof may be stored in the mouse 452 itself (e.g., Firmware). The mouse program may contain tables for interpreting the signals generated in the mouse. In one implementation, the tables may be accessed by a user through a control menu that serve as a control panel for reviewing and/or customizing the operation of the mouse, i.e., the user may quickly and conveniently review the settings and make changes thereto. Once changed, the modified settings will be automatically saved and thereby employed to handle future mouse processing. By way of example, the user may set the location of the primary and secondary buttons for right or left handed use. The user may set the meaning of left/right finger press to be a primary button, a third button, or a simultaneous left and right button activation. Additionally, the user may select between a one button mouse and a multibutton mouse. If the single button mouse is selected, the signals from the left and right sensors may be ignored. If the multibutton mouse is selected, the signals from the left and right sensors will be interpreted according to the settings in the mouse program. One advantage of being able to select the mouse type is that one mouse can be used by multiple users with different preferences, i.e., user configurable.

Figure 17:
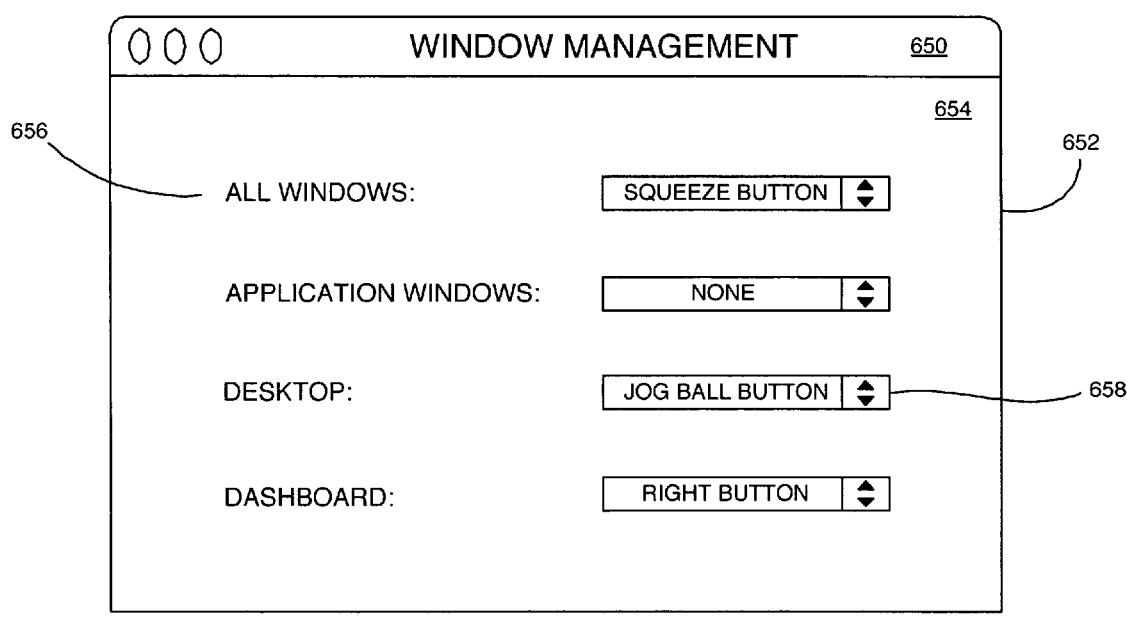
FIG. 17 is a diagram a graphical user interface, in accordance with one embodiment of the present invention.

FIG. 17 is a diagram a graphical user interface 650 (GUI), in accordance with one embodiment of the present invention. The GUI 650 represents the visual display panel for selecting which events of a window management program such as Expose' are controlled by which mouse buttons. Through the GUI 650, the user may quickly and conveniently review the mouse settings associated with the window management events and make changes thereto.

As shown, the GUI 650 includes a window frame 652 that defines a window or field 654 having contents contained therein. The contents include the various window management options 656, and mouse menus 658 for connecting the various mouse buttons to the window management options 656. The mouse menus 658 contain all the button possibilities including the hard press left and right buttons, the jog ball button, and the squeeze button. The button menus may also include light press left and right buttons, rotate left and right jog ball buttons and/or left and right squeeze buttons depending on how the mouse is configured. The buttons, when enabled, instructs the host system to control the various expose functions when the enabled mouse button is activated. For example, if the squeeze button is enabled in the Desktop mouse menu, every time the squeeze button is activated the Desktop feature is implemented, i.e., all the open windows are moved to the screen edge. In some cases, multiple buttons can be enabled for a single window management function.

In some cases, the GUI 650 may additionally include a Dashboard option 660 and mouse menus 662 for connecting one or more mouse buttons to the Dashboard. Dashboard is a control panel that includes customizable widgets (mini applications) that bring information to the user instantly—weather forecasts, stock quotes, yellow pages, airline flights, sport scores, etc. When the enabled mouse button is activated, the Dashboard is brought into view, and when the mouse button is deactivated, the Dashboard is removed from view. The user is able to receive up to date and timely info from the Internet with a click of a button, and then have it disappear instantly when button is released.

Figure 18:
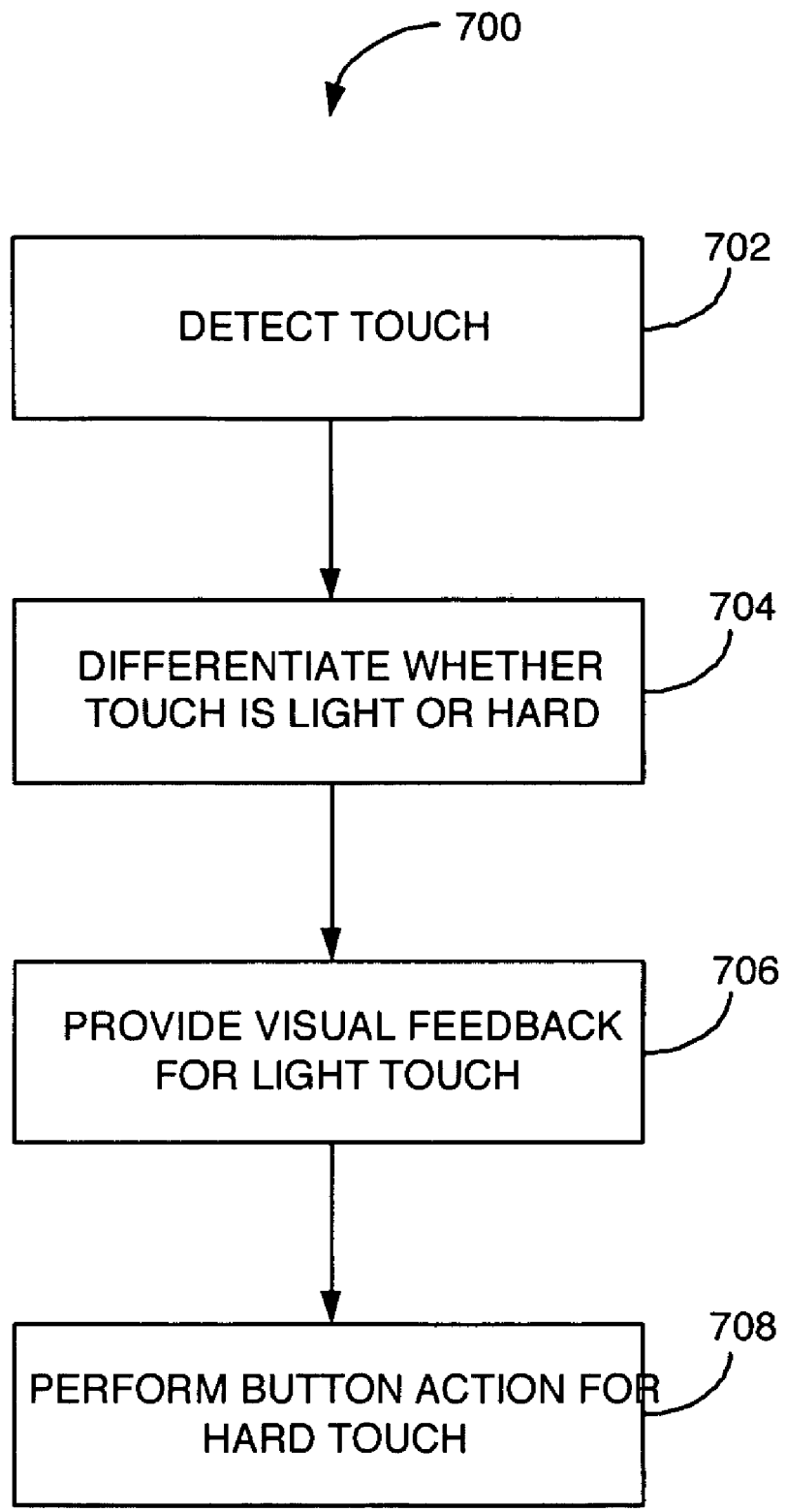
FIG. 18 is an input control method, in accordance with one embodiment of the present invention.

FIG. 18 is an input control method 700, in accordance with one embodiment of the present invention. The input control method may for example be performed using the arrangements shown in FIGS. 2 and 3 or 7 and 8. The method 700 generally begins at block 702 where a touch is detected. The touch may for example be detected on the left or right touch sensors or alternatively on both the left and right touch sensors of the mouse. When a touch is detected, the method 700 proceeds to block 704 where a determination is made as to whether or not the touch is a light touch or a hard touch. A light touch may be determined when the touch sensors are activated but not the main switch. A hard touch may be determined when the touch sensors are activated along with the main switch.

If it is determined that the touch is a light touch, the method 700 proceeds to block 706 where visual feedback is provided that alerts the user to which button will be activated when the light touch is changed to a hard touch. The visual feedback may be on the mouse and/or on the display screen of the host system. For example, if the user lightly places their finger on the right or secondary button, the right button may change color via a feedback generator and/or the display screen of the host system may provide a visual clue in the form of an icon as for example a menu. In addition, if the user lightly places their finger on the left or primary button, the left button may change color via a feedback generator and/or the display screen of the host system may provide a visual clue in the form of an icon as for example an arrow.

If it is determined that the touch is a hard touch, the method 700 proceeds to block 708 where a button action is implemented. For example, if the left button sensor is activated along with the main switch, then a left button event is reported, and if the right button sensor is activated along with the main switch, then a right button event is reported.

Figure 19:
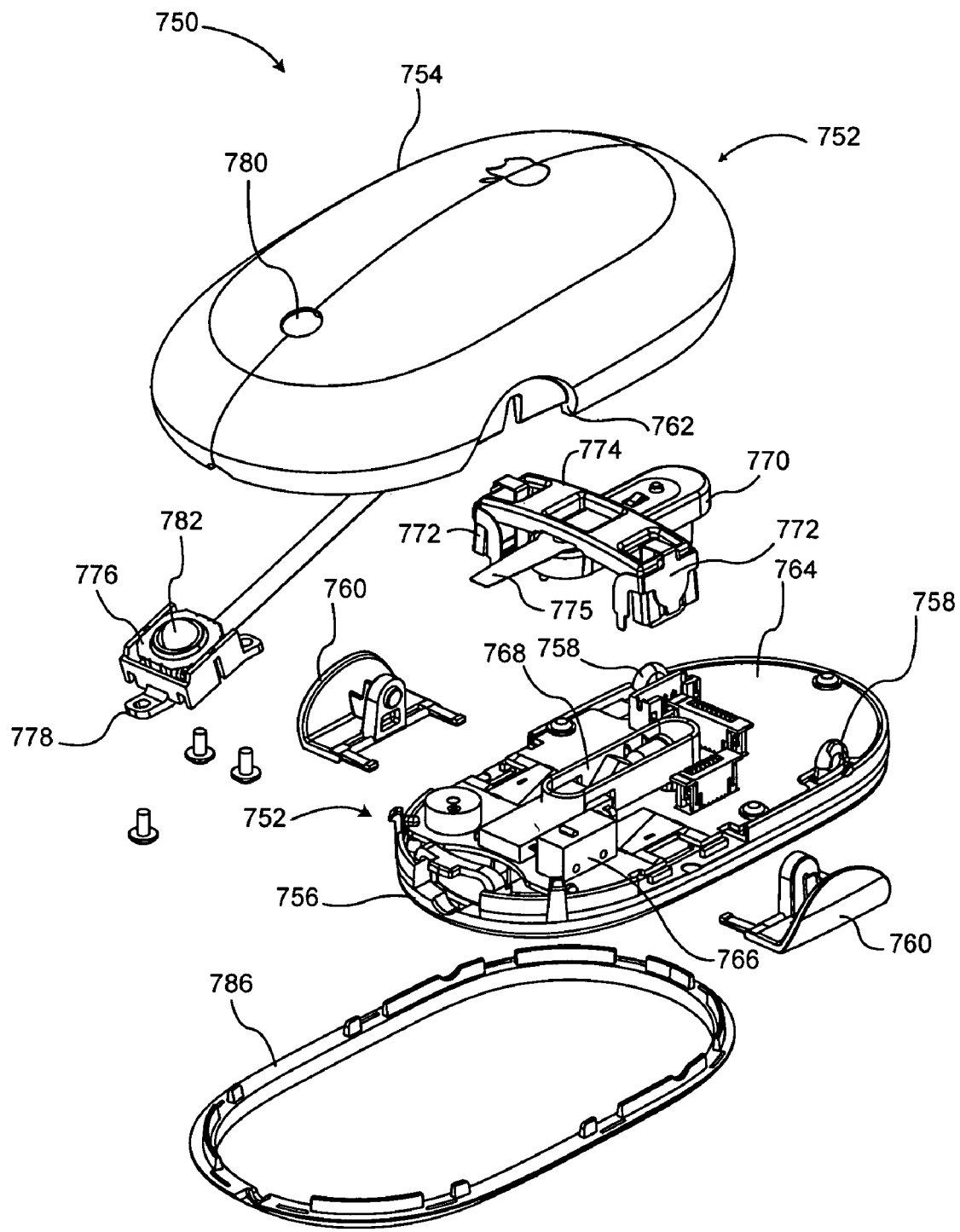
FIG. 19 is an exploded perspective view of a mouse, in accordance with one embodiment of the present invention.

FIG. 19 is an exploded perspective view of a unibody mouse 750, in accordance with one embodiment of the present invention. The unibody mouse 750 includes a housing 752 that encloses internally the various internal components of the mouse. Because the mouse is a unibody mouse, the housing 752 includes a top member 754 and a base 756.

As shown, the base 756 includes a pair of opposed pivots 758 that receive pivot pins located within the inside surface of the top member 754 thereby allowing the top member 754 to pivot about the base 756. The base 756 also includes a pair of opposed flexible wings 760. Although the wings 760 may be integrally connected to the base 756, in the illustrated embodiment, the wings 760 are attached or mounted onto the base 756. By way of example, the wings 760 may be snapped into mounting features on the base 756. Alternatively, the wings 760 may be welded to the base 756. In order to produce a continuous surface at the exterior of the mouse 750 when the mouse is assembled, the top member 754 includes a pair of recesses 762 for receiving the upwardly extending wings 760. The recesses 762 have an inner shape that coincides with the outer shape of the wings 760.

Located within the top member 754 and base 756 is a printed circuit board 764 that is mounted to the base 756. The printed circuit board 764 contains the various control circuitry of the mouse 750 including integrated circuits such as the mouse microcontroller and capacitive sensing circuitry. The printed circuit board 764 also contains a switch 766 for detecting when the top member 754 is pressed downward towards the base 756. The switch 766, which is positioned on the front side of the mouse 750 opposite the pivot may for example be a mechanical tact switch. The printed circuit board 764 and/or the base 756 may also support an optical sensor 768 for tracking mouse movement. The optical sensor 768 generally works through an opening in the base 756. The printed circuit board and/or base may further support a structural unit 770 that contains such items as capacitance force sensors 772 that are mounted on the sides of a support bridge 774 in the location of the flexible wings 760. The structural unit 770 may also include a spring 775 that helps bias and support the top member 754 in an upright position relative to the base 756.

The mouse 750 additionally includes a jog ball device 776 that is mounted to the inner surface of the top member 754 via a bracket 778. The bracket 778 may for example be screwed to the top member 754 so as to secure the jog ball device 776 in position relative to a hole 780 in the top member 754. The hole 780 allows the ball 782 of the jog ball device 776 to protrude through the top surface of the top member 754. The hole 780 is typically located in the front center of the top member 754 so that the ball 782 may be easily actuated by a finger when the hand is positioned on the mouse 750.

Although not shown, the mouse 750 further includes a pair of capacitive sensors placed on the inner surface of the top member 754 on opposite sides of the jog ball device 776. Each of the capacitive sensors may be one or more electrodes that are adhered to the front inner surface of the top member 754.

The mouse 750 may further include a shroud or faring 786 that snaps into the top member 754 around the edge of the base 756.

While this invention has been described in terms of several preferred embodiments, there are alterations, permutations, and equivalents, which fall within the scope of this invention. For example, the button determination/detection is not limited to the use of capacitance sensors, other sensors or switches may be used. For example a dome switch or membrane switch may be used in place of capacitance sensors. In addition, force sensors may be used. In any of these cases, the activation method remains unchanged, i.e., it requires the new device and the main switch to be activated for a button down event to be sent to the host computer. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A mouse, comprising:
 a housing including a unibody top member covering substantially all of a top surface of the mouse and a bottom member, the unibody top member configured to pivot relative to the bottom member to provide a clicking action; and
 an internal switch configured to generate an activation signal by the clicking action of the unibody top member, wherein the mouse further comprises;
  a first touch zone and a second touch zone provided on the surface of the unibody top member;
  a first touch sensor located underneath the surface of the top member in a region of the first touch zone, the first sensor configured to generate a first touch signal if the top member is touched in the first touch zone;
  a second touch sensor located underneath the surface of the top member in a region of the second touch zone, the second sensor configured to generate a second touch signal if the top member is touched in the second touch zone; and a control circuit configured to report a first input event if the activation signal and the first touch signal are generated without the second touch signal, to report a second input event if the activation signal and the second touch signal are generated without the first touch signal, to ignore the first touch signal if the first touch signal is generated without the activation signal, and to ignore the second touch signal if the second touch signal is generated without the activation signal.

2. The mouse as recited in claim 1, further comprising; third touch zones provided with a minimal amount of flex; and
force sensors located underneath the housing in the region of the third touch zones, forces exerted on the third touch zones being distributed to a force sensor.

3. The mouse as recited in claim 1, wherein the control circuit is further configured to ignore the first touch signal and the second touch signal if the first touch signal and the second touch signal are simultaneously generated without the activation signal.

4. The mouse as recited in claim 1, wherein the mouse is configurable to operate either as a single button mouse or a multiple button mouse.

5. The mouse as recited in claim 1, further comprising:
an electronically controlled feedback system configured to provide feedback to the user of the mouse so that the user is able to positively confirm that an action has resulted in an actual activation of one or more input mechanisms of the mouse.

6. The mouse as recited in claim 5 wherein the feedback system includes at least one of:
an audio feedback generator;
a haptics mechanism configured to output a vibration when a user performs an action with at least one of the input mechanisms; or
a visual feedback generator configured to output visual stimuli at the mouse when a user performs an action with at least one of the input mechanisms.

7. A mouse, comprising:
a housing including a unibody top member covering substantially all of a top surface of the mouse and a bottom member, the unibody top member configured to pivot relative to the bottom member to provide a clicking action, the bottom member includes a first wing and a second wing positioned at a first side and a second side of the housing, respectively, the first and second wings extending from a base of the bottom member into the top member, the top member including a first recess in the first side and a second recess in the second side so as to receive the first wing and the second wing respectively; and
an internal switch configured to generate an activation signal by the clicking action of the unibody top member, wherein the mouse further comprises:
a first force sensor located behind the first wing, the first force sensor generating a first force signal when increased pressure is exerted on the first wing;
a second force sensor located behind the second wing, the second force sensor generating a second force signal when increased pressure is exerted on the second wing;
a first touch zone and a second touch zone provided on the surface of the unibody top member;
a first touch sensor located underneath the surface of the top member in a region of the first touch zone, the first sensor configured to generate a first touch signal if the top member is touched in the first touch zone;
a second touch sensor located underneath the surface of the top member in a region of the second touch zone, the second sensor configured to generate a second touch signal if the top member is touched in the second touch zone; and
a control circuit configured to generate a control signal if the first and second force signals indicate a squeeze gesture having a force above a threshold, the control signal controlling operation of a computer program, to report a first input event if the activation signal and the first touch signal are generated without the second touch signal, to report a second input event if the activation signal and the second touch signal are generated without the first touch signal, to ignore the first touch signal if the first touch signal is generated without the activation signal, and to ignore the second touch signal if the second touch signal is generated without the activation signal.

8. The mouse as recited in claim 7, wherein the first and second force sensors are force sensitive capacitors, the force sensitive capacitor being located between the wings and a bridge located within the mouse.

9. The mouse as recited in claim 7, further comprising:
a jog ball device positioned at a surface of the top member, the jog ball device including:
a magnetic configured ball capable of rotating in multiple directions, the ball having
a diameter that is less than 10 mm;
a sealed housing provided in the top member, configured to receive the magnetic configured ball; and
a hall integrated circuit configured to generate direction signals indicating directions in accordance with rotation of the magnetic configured ball; and
a position sensing device configured to generate tracking signals when the mouse is moved along a surface,
wherein the control circuit is further configured to monitor the activation signal, the first and second touch signal, the first and second force signals, the direction signals, and the tracking signal, and to report tracking and multiple input events based at least in part on the activation signal, the first and second touch signal, the first and second force signals, the direction signals, and the tracking signal solely or in combination with one another.

10. The mouse as recited in claim 7, further comprising:
an electronically controlled feedback system configured to provide feedback to the user of the mouse so that the user is able to positively confirm that an action has resulted in an actual activation of one or more input mechanisms of the mouse.

11. The mouse as recited in claim 10 wherein the feedback system includes at least one of:
an audio feedback generator;
a haptics mechanism configured to output a vibration when a user performs an action with at least one of the input mechanisms; or
a visual feedback generator configured to output visual stimuli at the mouse when a user performs an action with at least one of the input mechanisms.

12. A mouse, comprising:
a housing including a unibody top member covering substantially all of a top surface of the mouse and a bottom member, the unibody top member configured to pivot relative to the bottom member to provide a clicking action;
an internal switch configured to generate an activation signal by the clicking action of the unibody top member; and a jog ball device positioned at a surface of the top member, wherein the jog ball device includes:
- a magnetic configured ball capable of rotating in multiple directions, the ball having a diameter that is less than 10 mm;
- a sealed housing provided in the top member, configured to receive the magnetic configured ball; and
- a hall integrated circuit configured to generate direction signals indicating directions in accordance with rotation of the magnetic configured ball, and wherein the mouse further comprises:
- a first touch zone and a second touch zone provided on the surface of the unibody top member;
- a first touch sensor located underneath the surface of the top member in a region of the first touch zone, the first sensor configured to generate a first touch signal if the top member is touched in the first touch zone;
- a second touch sensor located underneath the surface of the top member in a region of the second touch zone, the second sensor configured to generate a second touch signal if the top member is touched in the second touch zone; and
- a control circuit configured to generate a control signal based on the activation signal and the direction signals, to report a first input event if the activation signal and the first touch signal are generated without the second touch signal, to report a second input event if the activation signal and the second touch signal are generated without the first touch signal, to ignore the first touch signal if the first touch signal is generated without the activation signal, and to ignore the second touch signal if the second touch signal is generated without the activation signal.

13. The mouse as recited in claim 12, wherein the jog ball device further includes:
- a ball switch that generates a ball activation signal when the ball is pushed down inside the sealed housing,
wherein the control circuit is further configured to generate an input event signal if the internal switch and the ball switch both generate the activation signal and the ball activation signal, respectively.

14. The mouse as recited in claim 13, wherein the magnetic configured ball has a diameter between about 5 mm and about 8 mm.

15. The mouse as recited in claim 12, wherein the control circuit generates a third input event signal if the ball is moved to a first direction, and a fourth input event signal if the ball is moved to the second direction.

16. The mouse as recited in claim 12, wherein horizontal scrolling performed when the ball is spun horizontally and wherein vertical scrolling is performed when the ball is spun vertically.

17. A method for operating a mouse to control a user interface having a display screen, the mouse comprising:
- a housing including a unibody top member covering substantially all of a top surface of the mouse and a bottom member, the unibody top member configured to pivot relative to the bottom member to provide a clicking action, the top member including a first force sensitive portion on a first side, and a second force sensitive portion on a second side;
- an internal switch configured to generate an activation signal by the clicking action of the unibody top member;
- a first force sensor located behind the first force sensitive portion, the first force sensor generating a first force signal when increased pressure is exerted on the first force sensitive portion;
- a second force sensor located behind the second force sensitive portion, the second force sensor generating a second force signal when increased pressure is exerted on the second force sensitive portion;
- a first touch zone and a second touch zone provided on the surface of the unibody top member;
- a first touch sensor located underneath the surface of the top member in a region of the first touch zone, the first sensor configured to generate a first touch signal if the top member is touched in the first touch zone; and
- a second touch sensor located underneath the surface of the top member in a region of the second touch zone, the second sensor configured to generate a second touch signal if the top member is touched in the second touch zone;

the method comprising:
- monitoring the first and the second force signals;
- determining if a squeeze gesture above a threshold force occurred, based on the first and second force signals;
- generating a control signal if the squeeze gesture has occurred, the control signal controlling operation of a computer program on the display screen;
- reporting a first input event if the activation signal and the first touch signal are generated without the second touch signal;
- reporting a second input event if the activation signal and the second touch signal are generated without the first touch signal,
- ignoring the first touch signal if the first touch signal is generated without the activation signal; and
- ignoring the second touch signal if the second touch signal is generated without the activation signal.

18. The method of claim 17, wherein the operation includes at least one of:
- tiling and scaling down all open windows in the display screen;
- tiling and scaling down open windows associated with a particular application program in the display screen; or
- moving all open windows to the edges of the display screen.

19. The method of claim 17, wherein the control signal controlling an operation of a window management program based on an amount of pressure detected from the first and second force signals.

20. The method of claim 17, further comprising:
- determining whether the mouse has been lifted off a surface;
- if the mouse has not been lifted off the surface, determining if a first force threshold has been exceeded based on the first and second force signals, and reporting an input event signal when the force is above the first force threshold; and
- if the mouse has been lifted off the surface, determining if a second force threshold has been exceeded based on the first and second force signals, and reporting an input event signal when the force is above the second force threshold.

21. A method for operating a mouse, the mouse comprising:
- a housing including a unibody top member covering substantially all of a top surface of the mouse and a bottom member, the unibody top member configured to pivot relative to the bottom member to provide a clicking action;
- an internal switch configured to generate an activation signal by the clicking action of the unibody top member;

a first touch zone and a second touch zone provided on the surface of the unibody top member;
a first touch sensor associated with the first touch zone and configured to generate a first touch signal if the top member is touched in the first touch zone; and
a second touch sensor associated with the second touch zone, and configured to generate a second touch signal if the top member is touched in the second touch zone, the method comprising:
monitoring the first and second touch sensors;
monitoring the internal switch;
reporting a first input event if the activation signal and the first touch signal are generated without the second touch signal;
reporting a second input event if the activation signal and the second touch signal are generated without the first touch signal;
ignoring the first touch signal if the first touch signal is generated without the activation signal; and
ignoring the second touch signal if the second touch signal is generated without the activation signal.

22. The method as recited in claim 21, further comprising:
ignoring the first touch signal and the second touch signal if the first touch signal and the second touch signal are simultaneously generated without the activation signal.

* * * * *

UNITED STATES PATENT AND TRADEMARK OFFICE
CERTIFICATE OF CORRECTION

| | | |
|---|---|---|
| PATENT NO. | : 7,710,397 B2 | Page 1 of 1 |
| APPLICATION NO. | : 11/144345 | |
| DATED | : May 4, 2010 | |
| INVENTOR(S) | : Christoph H. Krah et al. | |

It is certified that error appears in the above-identified patent and that said Letters Patent is hereby corrected as shown below:

On Title Page 2, in column 2, under item (56); "Other Publications", line 28, delete "Tough Pad" and insert -- TouchPad --, therefor.

In column 12, line 20, delete "11 3B," and insert -- 113B, --, therefor.

In column 20, line 16, delete "my be" and insert -- may be --, therefor.

In column 28, line 28, in Claim 17, delete "signal," and insert -- signal; --, therefor.

Signed and Sealed this
First Day of November, 2011

David J. Kappos
*Director of the United States Patent and Trademark Office*